United States Patent
Desai et al.

(10) Patent No.: US 9,739,107 B2
(45) Date of Patent: Aug. 22, 2017

(54) REMOVABLE DOWNHOLE ARTICLE WITH FRANGIBLE PROTECTIVE COATING, METHOD OF MAKING, AND METHOD OF USING THE SAME

(71) Applicants: Neerali Janubhai Desai, Houston, TX (US); Elmer Richard Peterson, Porter, TX (US); Bradley A. Melancon, Houston, TX (US)

(72) Inventors: Neerali Janubhai Desai, Houston, TX (US); Elmer Richard Peterson, Porter, TX (US); Bradley A. Melancon, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 240 days.

(21) Appl. No.: 14/624,777

(22) Filed: Feb. 18, 2015

(65) Prior Publication Data

US 2015/0240584 A1   Aug. 27, 2015

Related U.S. Application Data

(60) Provisional application No. 61/943,194, filed on Feb. 21, 2014, provisional application No. 62/046,803, filed on Sep. 5, 2014.

(51) Int. Cl.
*E21B 29/02* (2006.01)
*E21B 33/12* (2006.01)
(Continued)

(52) U.S. Cl.
CPC .............. *E21B 29/02* (2013.01); *C09K 8/422* (2013.01); *E21B 33/124* (2013.01);
(Continued)

(58) Field of Classification Search
CPC ........ E21B 29/02; E21B 34/063; E21B 43/08; E21B 33/124; C09K 8/422
See application file for complete search history.

(56) References Cited

U.S. PATENT DOCUMENTS

| | | | |
|---|---|---|---|
| 2003/0075324 | A1 | 4/2003 | Dusterhoft et al. |
| 2006/0048942 | A1 | 3/2006 | Moen et al. |

(Continued)

FOREIGN PATENT DOCUMENTS

| | | |
|---|---|---|
| WO | 2012058436 A2 | 5/2012 |
| WO | 2013120197 A1 | 8/2013 |

OTHER PUBLICATIONS

International Search Report regarding related PCT Application No. PCT/US2015/016577, dated Jun. 3, 2015; 6 pages.

(Continued)

*Primary Examiner* — Brad Harcourt
(74) *Attorney, Agent, or Firm* — Cantor Colburn LLP

(57) ABSTRACT

A method of opening an orifice in a downhole article includes forming a downhole article having an orifice, the orifice having a selectively removable plug sealingly disposed therein, the selectively removable plug comprising a selectively removable plug body formed of a plug body material and a selectively removable sealant coating formed of a coating material disposed on an outer surface of the plug body. The method also includes disposing the article within a wellbore. The method further includes exposing the selectively removable plug to a first wellbore fluid that is configured to selectively remove the sealant coating and provide a fluid access to the plug body. The method further includes exposing the selectively removable plug body to a second wellbore fluid through the fluid access that is configured to selectively remove the plug body and using the second wellbore fluid to break the sealant coating into a plurality of pieces.

28 Claims, 16 Drawing Sheets

(51) Int. Cl.
*C09K 8/42*     (2006.01)
*E21B 33/124*   (2006.01)
*E21B 43/08*    (2006.01)
*E21B 34/06*    (2006.01)

(52) U.S. Cl.
CPC ........ *E21B 33/1208* (2013.01); *E21B 34/063* (2013.01); *E21B 43/08* (2013.01)

(56) References Cited

U.S. PATENT DOCUMENTS

| | | |
|---|---|---|
| 2008/0135249 A1 | 6/2008 | Fripp et al. |
| 2009/0283270 A1 | 11/2009 | Langeslag |
| 2009/0283271 A1 | 11/2009 | Langeslag |
| 2011/0084483 A1* | 4/2011 | Nunez ................ C23C 28/00 285/334 |
| 2012/0273229 A1 | 11/2012 | Xu et al. |
| 2014/0020898 A1 | 1/2014 | Holderman et al. |
| 2014/0096970 A1 | 4/2014 | Andrew et al. |
| 2015/0240587 A1 | 8/2015 | Peterson et al. |

OTHER PUBLICATIONS

International Search Report regarding related PCT Application No. PCT/US2015/016579; dated Jun. 4, 2015; 6 pages.
Written Opinion regarding related PCT Application No. PCT/US2015/016577, dated Jun. 3, 2015; 12 pages.
Written Opinion regarding related PCT Application No. PCT/US2015/016579, dated Jun. 4, 2015; 11 pages.

\* cited by examiner

REMOVABLE DOWNHOLE ARTICLE WITH FRANGIBLE PROTECTIVE COATING, METHOD OF MAKING, AND METHOD OF USING THE SAME

CROSS REFERENCE TO RELATED APPLICATIONS

This application claims priority to U.S. provisional application 61/943,194, filed Feb. 21, 2014 and U.S. provisional application 62/046,803, filed Sep. 5, 2014, the entire contents of which are incorporated herein by reference.

BACKGROUND

Downhole drilling, completion and production operations often utilize downhole components or tools in the wellbore that, due to their function, have orifices that must be closed at one time for various downhole operations, but must be selectively openable in order that they may be opened at a later predetermined time in conjunction with other downhole operations. While there are a number of downhole articles where such orifices are used, one example is a multi-shifting service valve.

Multi-shifting service valves are used in strings that include tubular sections and other downhole tools and components and that are housed within a well casing to establish zone isolation essential for downhole completion and production operations. The multi-shifting service valves establish a plurality of zones along the length of the string and well casing adjacent to reservoirs within the earth formation where completion and production operations, such as gravel packing and hydraulic fracturing and associated operations, are to be performed, and together with other downhole tools and components, such as packers, provide zone isolation between the zones.

Multi-shifting service valves have generally been employed in various subs. They are gate valve assemblies that generally employ a basepipe that includes a plurality of orifices through the pipe wall, a sliding sleeve disposed on the inner diameter of the basepipe and a screen on the outer diameter of the basepipe. The sliding sleeve may be actuated by sliding upward or downward within the wellbore, for example, from a position where it is covering and thus closing the orifices to a position where they are open. The screen is disposed over the orifice to prevent particulates, for example, from entering and plugging them. While multi-shifting service valves are very useful, they require various actuators and the establishment and maintenance of various mechanical linkages, often along thousands of feet of a string, to provide sliding movement and actuation of the sliding sleeves to open the orifices. This can be undesirable due to the necessity of maintaining operability of these mechanical connections along the length of the string, often in corrosive conditions or fluids, for an indeterminate length of time, including hours, days, weeks, months or more, since there may be an indeterminate interval between completion and production operations, for example. In addition, the number of orifices, as well as their size, shape and pattern on the basepipe, may be constrained by the necessity of their being covered by the sliding sleeve, and the fact that a portion of the space envelope or the working volume of the inner diameter of the basepipe must be reserved for movement of the sleeve. In some applications, it is desirable to eliminate the constraints associated with the sliding sleeve mechanism to gain additional flexibility in the design and placement of the valve and the sizing and placement of the orifices.

Therefore, it is desirable to develop articles, including downhole tools and components, that have an orifice or multiple orifices that may selectively opened downhole without the use of sliding sleeves. In particular, it is desirable to develop a service valve having orifices that are selectively openable without the use of sliding sleeves, as well as actuation devices that may be used to close the orifices while also providing for their selective openability.

SUMMARY

In an exemplary embodiment, a method of opening an orifice in a downhole article is disclosed. The method includes forming a downhole article having an orifice, the orifice having a selectively removable plug sealingly disposed therein, the selectively removable plug comprising a selectively removable plug body formed of a plug body material and a selectively removable sealant coating formed of a coating material disposed on an outer surface of the plug body, a first end and an opposed second end of the plug body, at least one of the first end and the second end comprising a non-planar portion of the outer surface defining a surface texture, the non-planar portion and surface texture defining a shape of the sealant coating disposed thereon. The method also includes disposing the article within a wellbore. The method further includes exposing the selectively removable plug to a first wellbore fluid that is configured to selectively remove the sealant coating and provide a fluid access to the plug body. The method further includes exposing the selectively removable plug body to a second wellbore fluid through the fluid access that is configured to selectively remove the plug body. Still further, the method includes using the second wellbore fluid to break the sealant coating disposed on the non-planar portion into a plurality of pieces.

In another exemplary embodiment, a selectively removable fastener plug is disclosed. The plug includes a selectively removable plug body formed of a selectively removable plug body material. The selectively removable fastener plug also includes a selectively removable sealant coating comprising a selectively removable coating material disposed on an outer surface thereof. The selectively removable fastener plug also includes a first end and an opposed second end of the plug body, at least one of the first end and the second end comprising a non-planar portion of the outer surface defining a surface texture.

In yet another exemplary embodiment, a downhole basepipe assembly is disclosed. The downhole basepipe assembly includes a basepipe, the basepipe having a pipe wall and an orifice that extends through the wall from an inner surface to the outer surface. The basepipe assembly also includes a selectively removable plug sealingly disposed in the orifice, the selectively removable plug comprising a selectively removable plug body formed of a plug body material, a selectively removable sealant coating formed of a coating material disposed on an outer surface of the plug body, and a first end and an opposed second end of the plug body, at least one of the first end and the second end comprising a non-planar portion of the outer surface defining a surface texture. The basepipe assembly further includes a screen disposed on a portion of an outer surface of the basepipe and attached to the outer surface about a periphery thereof, the orifice disposed under the screen.

In still another embodiment, a downhole article is disclosed. The downhole article comprising an article, such as a downhole tool or component, having an orifice that extends through a wall from an inner surface to an outer surface. The article also includes a selectively removable plug sealingly disposed in the orifice, the selectively removable plug comprising a selectively removable plug body formed of a plug body material, a selectively removable sealant coating formed of a coating material disposed on an outer surface of the plug body, a first end and an opposed second end of the plug body, at least one of the first end and the second end comprising a non-planar portion of the outer surface defining a surface texture.

In still another embodiment, a method of opening an orifice in a downhole article is disclosed. The method includes forming a downhole article having an orifice, the orifice having a selectively removable plug sealingly disposed therein, the selectively removable plug comprising a selectively removable plug body formed of a plug body material and a selectively removable sealant coating formed of a coating material disposed on an outer surface of the plug body, a first end and an opposed second end of the plug body, at least one of the first end and the second end comprising a non-planar portion of the outer surface defining a surface texture, the selectively removable plug body sealingly disposed within a fastener jacket that is attached to and sealably disposed within the orifice. The method also includes disposing the article within a wellbore. The method further includes exposing the selectively removable plug to a first wellbore fluid that is configured to selectively remove the sealant coating and provide a fluid access to the plug body. Still further, the method includes exposing the selectively removable plug body to a second wellbore fluid through the fluid access that is configured to selectively remove the plug body, and using the second wellbore fluid to break the sealant coating disposed on the non-planar portion into a plurality of pieces.

In still another embodiment, a selectively removable fastener plug is disclosed. The selectively removable fastener plug includes a selectively removable plug body formed of a selectively removable plug body material. The selectively removable fastener plug also includes a selectively removable sealant coating comprising a selectively removable coating material disposed on an outer surface of the plug body, a first end and an opposed second end of the plug body, at least one of the first end and the second end comprising a non-planar portion of the outer surface defining a surface texture. The selectively removable fastener plug also includes a fastener jacket, the fastener jacket comprising an attachment mechanism on an outer surface and within an inner bore a housing, the selectively removable plug body sealingly disposed within the housing chamber by the selectively removable coating material, wherein selectively removable coating material comprises a selectively removable polymer or metal.

In yet another embodiment, a downhole article is disclosed. The downhole article includes an article, the article having an orifice that extends through a wall from an inner surface to an outer surface. The downhole article also includes a selectively removable plug sealingly disposed in the orifice, the selectively removable plug comprising a selectively removable plug body formed of a plug body material, a selectively removable sealant coating formed of a coating material disposed on an outer surface of the plug body, a first end and an opposed second end of the plug body, at least one of the first end and the second end comprising a non-planar portion of the outer surface defining a surface texture, and a fastener jacket, the fastener jacket comprising an attachment mechanism on an outer surface and within an inner bore a housing, the selectively removable plug body sealingly disposed within the housing chamber by the selectively removable sealant coating.

BRIEF DESCRIPTION OF THE DRAWINGS

Referring now to the drawings wherein like elements are numbered alike in the several Figures.

DETAILED DESCRIPTION

Figure 3:
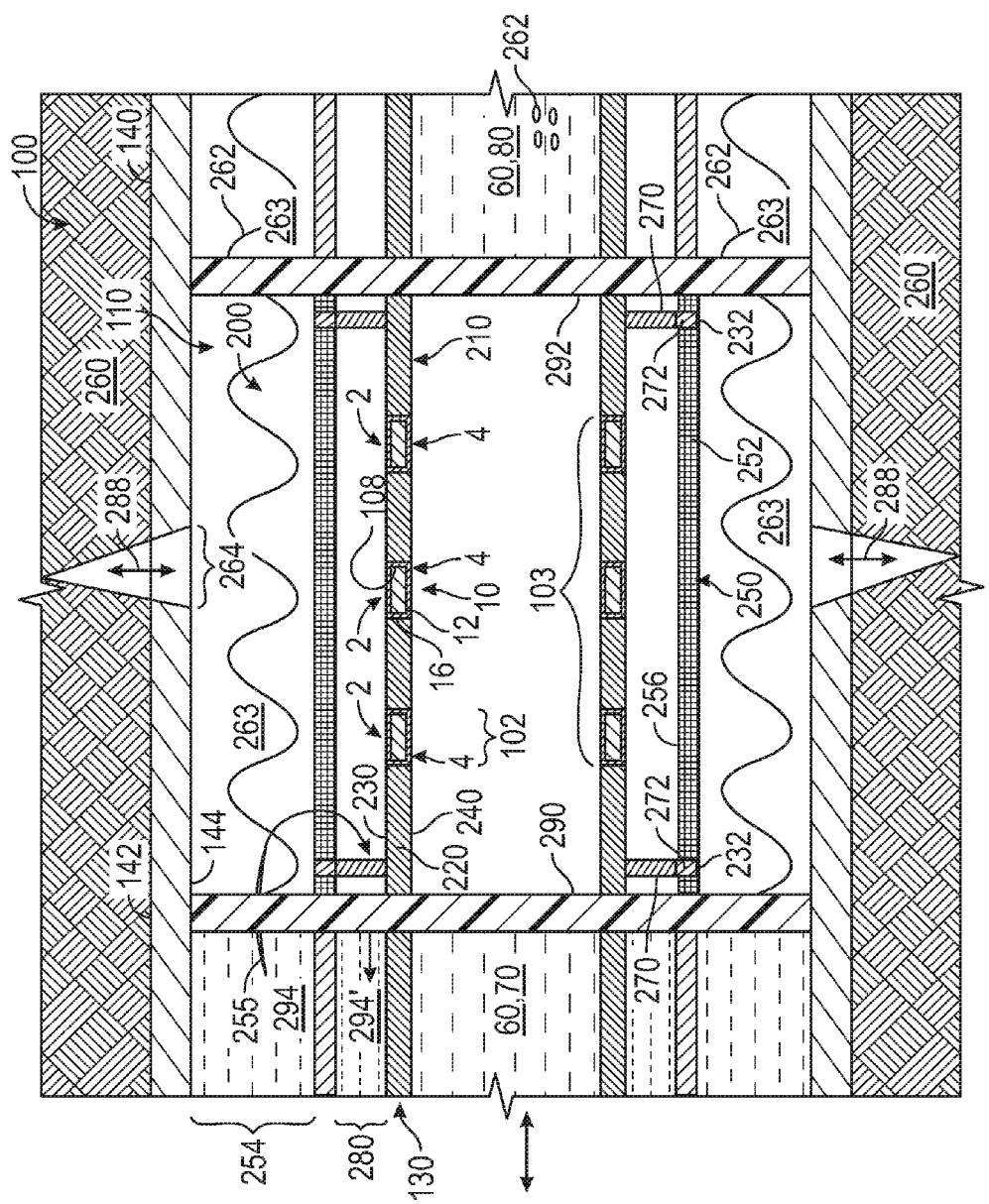
FIG. 3 is a cross-sectional view of an exemplary embodiment of a downhole service valve comprising a basepipe assembly that includes a selectively openable orifice.
Figure 4:
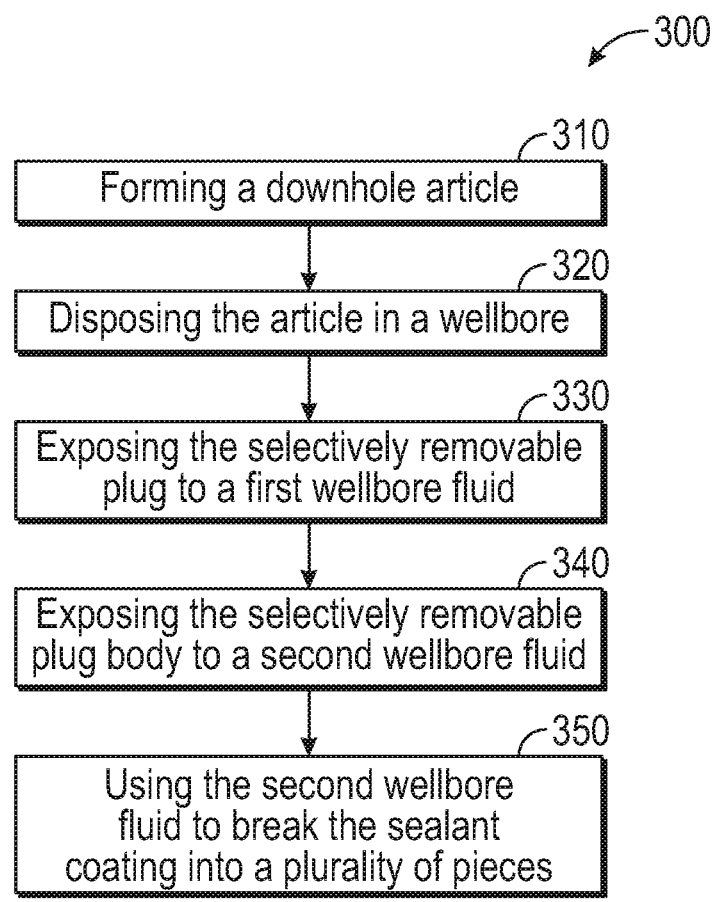
FIG. 4 is a flowchart of a method of using an article having a selectively openable orifice.

Referring to FIGS. 1A-4, and particularly to FIG. 1, an example of a selectively removable fastener plug 10 is disclosed. The fastener plug 10 is configured for sealing engagement and disposition in an orifice 102 of an article 100, which in an exemplary embodiment may be a downhole article 110 including various downhole tools 112 or components 114 as illustrated schematically in FIG. 2. These downhole articles 110 may include, for example, downhole tools or components that inhibit flow, such as various seals, high pressure beaded frac screen plugs, screen basepipe plugs, coatings for balls and seats, compression packing elements, expandable packing elements, O-rings, bonded seals, bullet seals, sub-surface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, sleeves. They may also include downhole tools or components that are pumpable within a downhole environment, such as direct connect plugs, bridge plugs, wiper plugs, frac plugs, components of frac plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, and darts. These downhole articles 110 may also include downhole tools or components that include a removable material composition, as described herein, for other than the removable fastener plug, as described herein, such as various flappers, hold down dogs and springs, screen protectors, seal bore protectors, electric submersible pump space out subs, full bore guns, chemical encapsulations, slips, dogs, springs and collet restraints, liner setting sleeves, timing actuation devices, emergency grapple release, chemical encapsulation containers, screen protectors, beaded screen protectors, whipstock lugs, whipstock coatings, pins, set screws, emergency release tools, gas generators, mandrels, release mechanisms, staging collars, C-rings, components of perforating gun systems, disintegrable whipstock for casing exit tools, shear pins, dissolvable body locking rings, mud motor stators, progressive cavity pump stators, shear screws. In an exemplary embodiment, as shown in FIG. 3, the downhole article 110 may comprise a service valve 120 and include a basepipe assembly 200, as described herein. The selectively removable fastener plug 10 may be inserted into and fastened within the orifice 102. Upon insertion, the fastener plug 10 sealably engages at least one of the orifice 102, or the first surface 104 of article 100, such as and/or the second surface 106 of the article 100 proximate the orifice 102 to provide a fluid seal 50 of the orifice 102 between the fastener plug 10 and the article 100.

The fastener plug 10 includes a selectively removable plug body 12 formed of a selectively removable plug body material 14. The fastener plug 10 also includes a selectively removable sealant coating 16 comprising a selectively removable coating material 18 disposed on an outer surface 19 of the plug body 12.

Figure 1A:
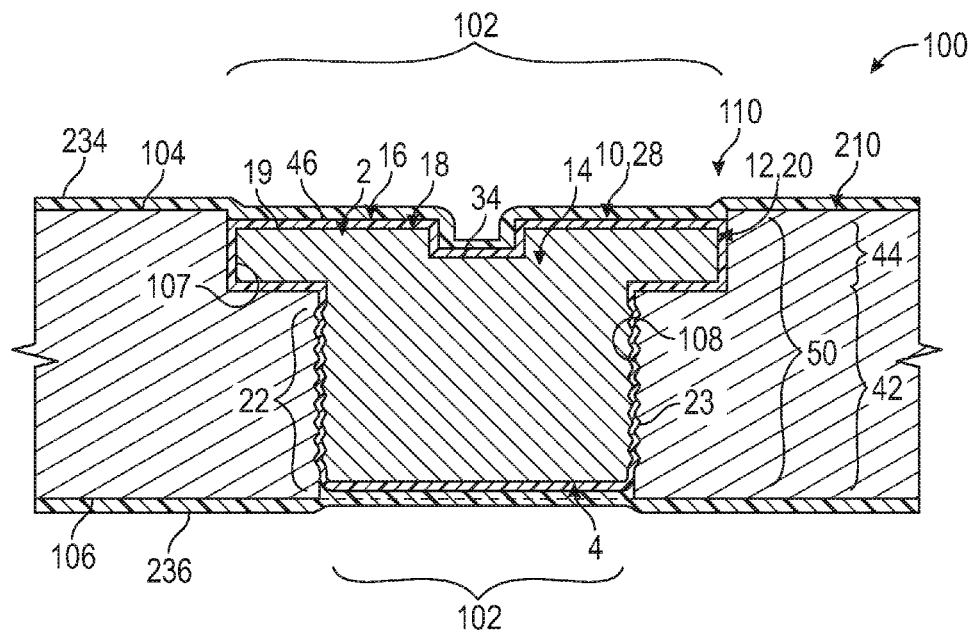
FIG. 1A-1G are exemplary cross-sectional views of embodiments of a selectively removable fastener plug for disposition in and closing of an orifice of an article, such as a downhole article, and subsequent selective removal.
Figure 1B:
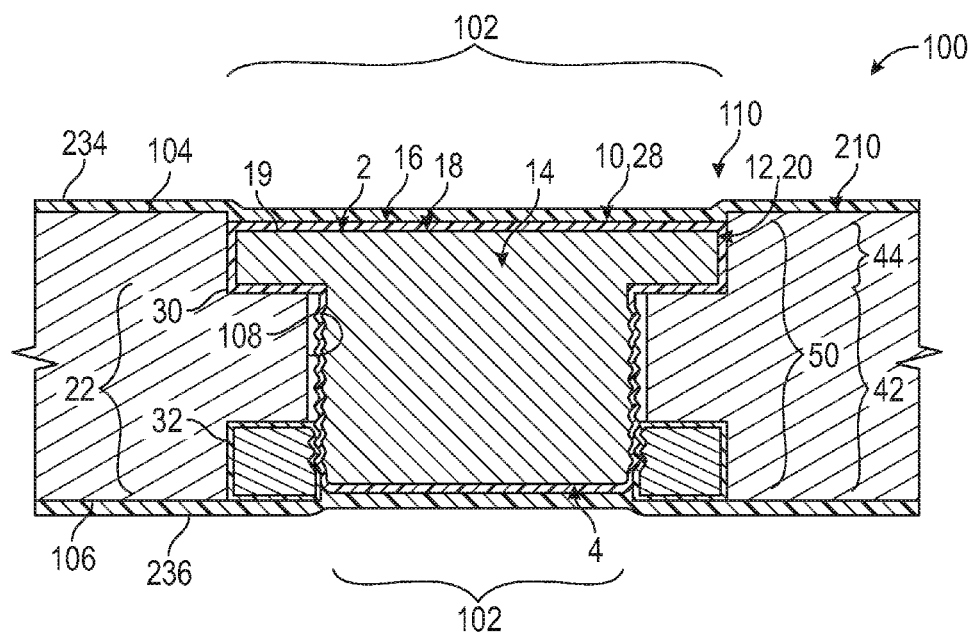
Figure 1C:
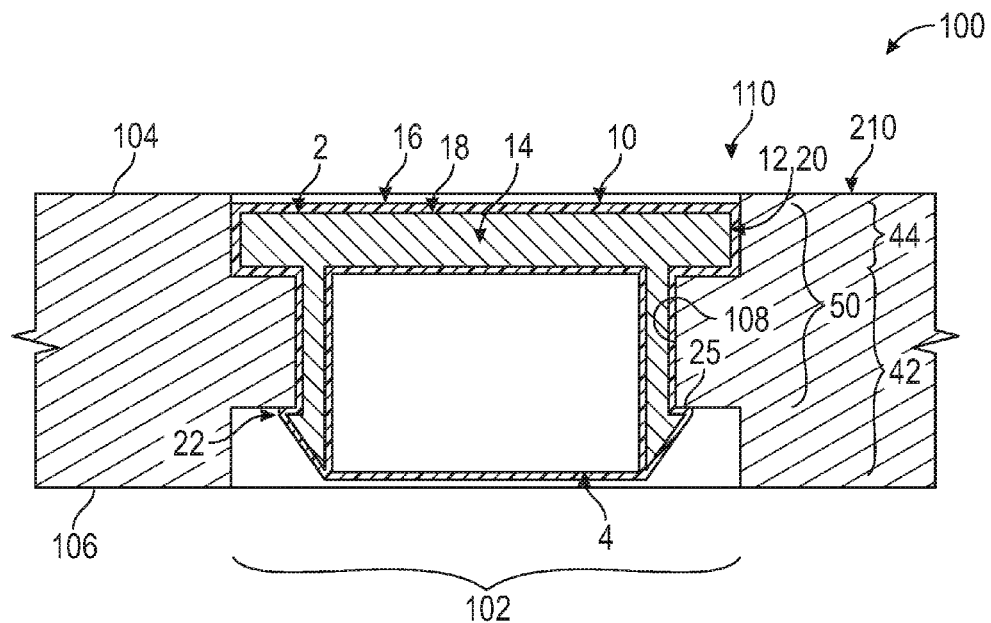
Figure 1D:
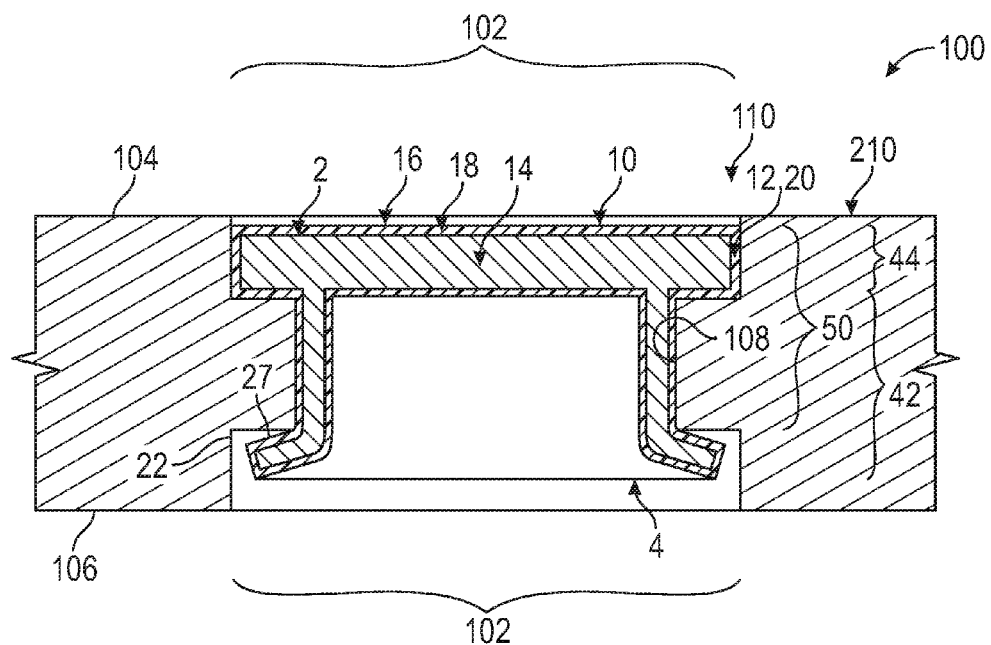
Figure 1E:
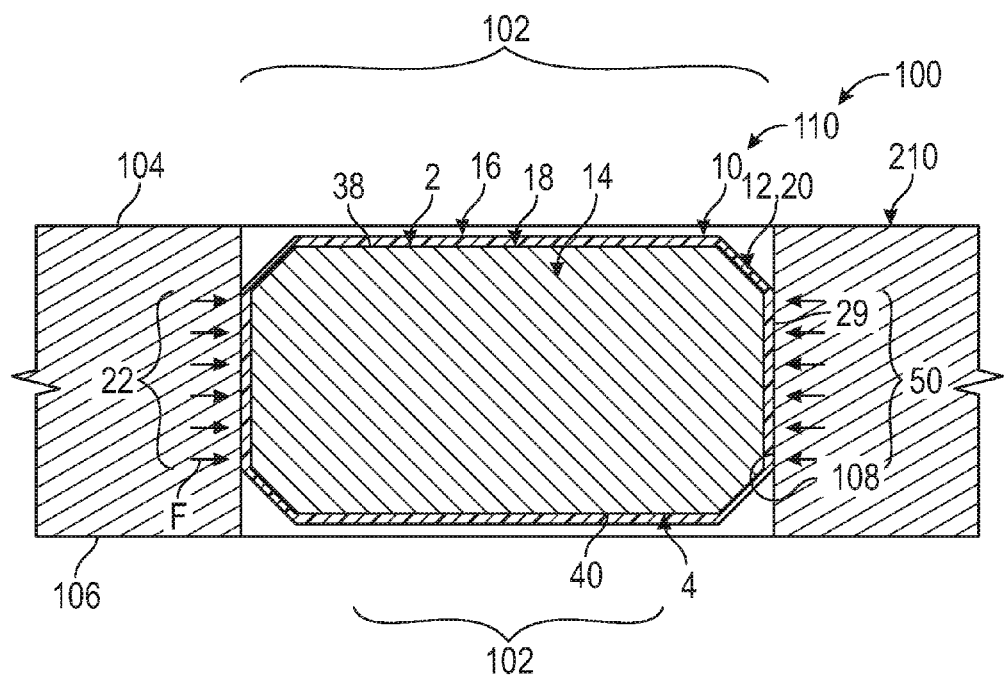
Figure 1F:
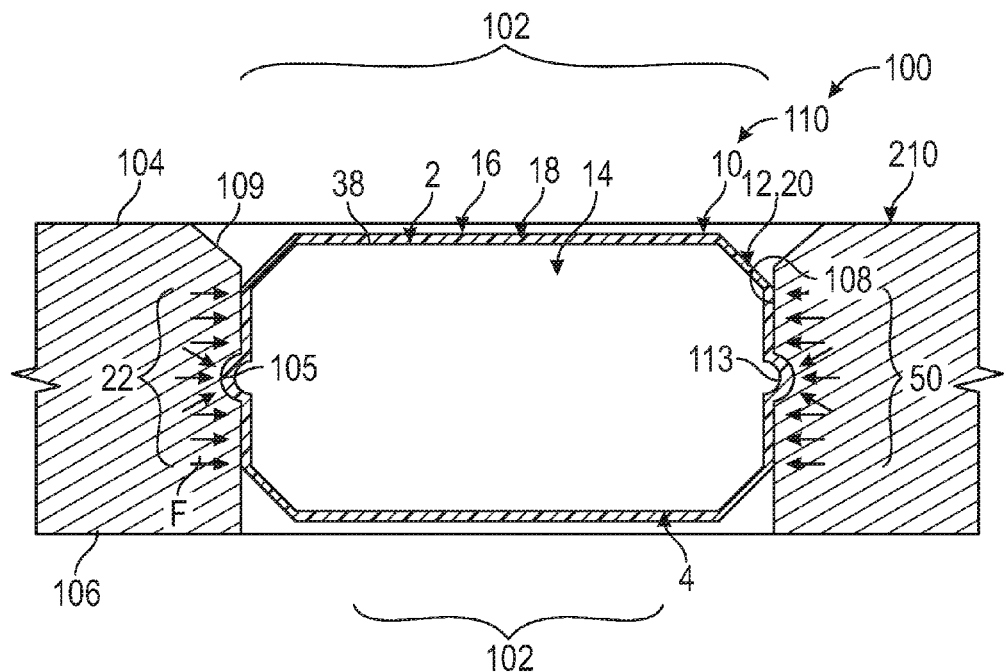

The plug body 12 may have any suitable plug body configuration, including any suitable shape or size. In one exemplary embodiment, the plug body 12 comprises a fastener 20 and provides a fastener mechanism 22. That is, the fastener 20 is cooperatively configured for being fastened within the orifice 102 in sealable mating engagement with the orifice 102 to provide the fluid seal 50. Exemplary embodiments of the fastener 20 and fastener mechanism 22 may include, but are not limited to, a threaded fastener and a threaded mechanism 23 (FIGS. 1A and 1B), a snap-fit fastener and a snap-fit mechanism 25 (FIG. 1C), an expansion-set fastener and expansion-fit mechanism 27 (FIG. 1D), a compression-set fastener and compression-fit mechanism 29 and forces F (FIG. 1E), a camming fastener and a camming mechanism and forces F (FIG. 1F), or an adhesive-fit fastener and adhesive-fit mechanism 31 (FIG. 1G), or a combination thereof. The fastener 20 and fastener mechanism 22 may include all manner of conventional fastener types and forms and fastening mechanisms that are made using materials other than selectively removable plug body material 14 and selectively removable coating material 18. The fastener 20 and the fastener mechanism 22 may involve or include one member or a plurality of members, such as two members. Where the fastener 20 includes one member, it may be configured for mating sealable engagement directly with the orifice 102, and may include, for example, various headed or non-headed threaded screws (not shown) and threaded bolts 28, which may be configured to engage a threaded portion 106 of the orifice 102 with mating threads as shown in FIG. 1A or a smooth bore wall of the orifice 102 as shown in FIG. 1B. Where the fastener 20 includes a plurality of members, such as two or more members, the fastener 20 may be configured for mating engagement amongst the plurality of members to provide mating sealable engagement of the members with the orifice 102, and may include, for example, various headed or non-headed threaded members as a first member 30, which may be configured to matingly engage a threaded recess portion of the second member 32. Turning the first member 30 into the threaded recess portion of the second member 32 draws them together and causes them to seal the orifice 102 by sealably engaging at least one of the bore 108, or the first surface 104 and/or the second surface 106 of the article 100 proximate the orifice 102 to provide a fluid seal 50 of the orifice 102 between the fastener plug 10 and the article 100, as shown in FIG. 1B. Where the fastener 20 comprises a plurality of members, one or more of the members, such as first member 30 or second member 32 may also include an anti-rotation or rotation limiting feature, such as a key 110 or the like, which is configured to engage at least one of a mating keyway 112 in the bore 108, or the first surface 104 and/or the second surface 106 of the article 100 proximate the orifice 102 to provide orientation of the fastener member to the orifice 102, first surface 104 and/or the second surface 106 and promote fastening with the mating fastener member.

In one embodiment, the fastener 20, including any of the members thereof, such as first member 30 and second member 32, may include a predetermined and preformed driving feature 34 that is configured for engagement with a driving tool or tools (not shown) to fasten the fastener 20 to the article 100 within the orifice 102 by applying a torque. Any suitable driving feature 34 may be utilized, including various conventional driving features. The driving feature 34 may include any protruding feature, recessed feature, or a combination thereof. Non-limiting examples include a recessed feature having a predetermined size that is configured to receive a straight-blade, Phillips-head, Torx-head, Allen-head, square-head, spanner or hex-head driver. Non-limiting examples of a protruding feature include square, hexagonal and double hexagonal protrusions having a predetermined size that is configured to receive all manner of wrenches and socket drivers.

In one embodiment, the fastener 20 may include an expansion-set fastener and expansion-fit mechanism in the form of a single member having a peripheral shape that is configured to closely conform to that of the periphery orifice 102 and is slidably engageable therein, such as a rivet (FIG. 1E), that may be upset on a first end 38 or a second end 40, or both, to expand the end(s) sufficiently to sealably retain the fastener 20 in the orifice 102. In another embodiment, the fastener 20 may include an expansion-set fastener and expansion-fit mechanism in the form of a two members having a peripheral shape that is configured to closely conform to that of the periphery orifice 102 and is slidably engageable therein, such as a pop rivet (not shown), that may be upset using a pop rivet tool to draw a first member that includes a solid bulbous mandrel on one end into a second member that has a hollow barrel and a protruding head on an end opposite the mandrel, with an inner diameter that is smaller than the diameter of the mandrel, thereby causing an end of the barrel to deform and expand to fasten the fastener 20 into the orifice 102 in sealing engagement.

In one embodiment, the plug body 12 comprises a shank portion 42 for disposition proximate the bore 108 and a protruding head 44 for disposition proximate the first surface 104 or the second surface 106 of the article 100 proximate the orifice 102. The shank portion may extend completely through the bore 108 or only partially through the bore 108. The plug body 12 may have any suitable peripheral or cross-section shape, such as various regular and irregular polygonal shapes and curved shapes, as well as various elongated shapes including various elongated rectangular and rounded rectangular shapes configured for sealable engagement in a correspondingly shaped orifice comprising a slot, for example. In one embodiment, the plug body 12 including the shank portion 42 and the protruding head are substantially non-cylindrical. In other embodiments, where the orifice 102 and the bore 108 are substantially cylindrical, the shank portion 42 and the protruding head 44 are substantially cylindrical. In one embodiment, the shank portion 42 is substantially solid, such as a solid cylinder (e.g. FIG. 1A). In another embodiment, the shank portion 42 is substantially hollow, such as a hollow cylinder (e.g. FIG. 1C). The plug body 12 may have any suitable size. In one embodiment, the shank portion 42 is substantially cylindrical and has an outer diameter of about 0.2 to about 0.8 inches, and more particularly about 0.4 to about 0.6 inches, and even more particularly about 0.5 inches.

The plug body 12 is formed from and includes selectively removable plug body material 14. The plug body material 14 is selectively removable in various wellbore fluids 60, and more particularly in various acidic wellbore fluids 70. As used herein to describe the plug body material 14 or the coating material 18, the term "removable" encompasses all manner and chemical and physical mechanisms of removing of the plug body 12 and plug body material 14 from an orifice 102 and, while not intending to be limited to the following, may also be described as selectively corrodible, degradable, dissolvable, disintegrable, dissociable, disassemblable and disappearing, for example. In one embodiment, the selectively removable plug body material 14 includes a powder compact comprising a substantially-continuous, cellular nanomatrix comprising a nanomatrix material; a plurality of dispersed particles comprising a particle core member material that comprises Mg, Al, Zn, Fe or Mn, or alloys thereof, or a combination thereof, dispersed in the cellular nanomatrix; and a bond layer extending throughout the cellular nanomatrix between the dispersed particles. The nanomatrix material may include, for example, Al, Zn, Mn, Mg, Mo, W, Cu, Fe, Si, Ca, Co, Ta, Re, or Ni, or alloys thereof, or an oxide, nitride or a carbide thereof, or a combination of any of the aforementioned materials that is different from the core member material. These powder compact materials are described in greater detail in commonly owned, co-pending U.S. patent application Ser. No. 12/633,682 filed on Dec. 8, 2009 and Ser. No. 12/913,310 filed on Oct. 27, 2010, which are incorporated herein by reference in their entirety.

The fastener plug 10 also includes a selectively removable sealant coating 16 comprising a selectively removable coating material 16 disposed on an outer surface of the plug body 12. The selectively removable coating material 16 covers the plug body material and isolates it from wellbore fluids 60, particularly acidic wellbore fluids 70. The selectively removable sealant coating 16 includes a selectively removable coating material 18. The selectively removable coating material 18 is selectively removable in various wellbore fluids 60 that are different from those used to selectively remove the plug body material 14, and more particularly in various basic wellbore fluids 80. In one embodiment, the selectively removable coating material 18 is selectively removable in a basic wellbore fluid 80 and substantially acid-resistant or resistant to removal in acidic wellbore fluids 70, and the selectively removable plug body material 14 is selectively removable in an acidic wellbore fluid and substantially base-resistant or resistant to removal in a basic wellbore fluid 80. Selective removal of the coating material may include complete removal, as by dissolution, and may also include softening, sloughing or becoming permeable sufficiently to provide access of the an acidic wellbore fluid 70 to the plug body material 14 to promote its removal by the fluid.

In one embodiment, the selectively removable coating material 18 includes a selectively removable polymer. Any suitable selectively removable polymeric material may be used. In one embodiment, the polymeric material includes a thermoset resin, including a polyamide resin, and more particularly a polyamide-imide resin, such as, for example various Xylan® resin sold, for example, by the Whitford Corporation. The polymeric material may also include a filler, including a particulate filler, and further including various mineral, glass, carbon or other particles or fibers. The filler may also include a solid lubricant. In one embodiment, the solid lubricant includes particles of a fluoropolymer or a dry-film lubricant, or both. In one embodiment, the fluoropolymer includes, for example, polytetrafluoroethylene (PTFE), perfluoroalkoxy alkane (PFA), or fluorinated ethylene propylene (FEP), or a combination thereof, and the dry-film lubricant comprises molybdenum disulfide or graphite.

The fastener plug 10 is configured for sealing engagement and disposition in an orifice 102 of an article 100, which in an exemplary embodiment may be a downhole article 110, which in an exemplary embodiment as shown in FIG. 3 may include a service valve 120 and basepipe assembly 200. The service valve 120 and basepipe assembly 200 is configured for assembly to other members of a downhole string 130 that may include any of various downhole tubulars and subs used in any of various well completion and production operations, including well operations for oil, natural gas, water and carbon dioxide sequestration. The service valve 120 and string 130 are configured for disposition within a tubular well casing 140 that may extend from the earth's surface underwater and/or underground for ten to twenty thousand feet or more in a vertical, horizontal or angled orientation, or a combination thereof. The well casing 140 may have any suitable cross-sectional or peripheral size that is configured for disposition within the wellbore, including an outer diameter of about 5 to about 21 inches, and an inner diameter of about 4 to about 18 inches.

The downhole basepipe assembly 200 includes a basepipe 210. The basepipe 210 may have any suitable cross-sectional or peripheral shape, including a tubular or cylindrical pipe or conduit. The basepipe 210 may have any suitable cross-sectional or peripheral (i.e. circumferential) size that is configured for disposition within the well casing 140, including an outer diameter 142 of about 3 to about 17 inches, and an inner diameter 144 of about 2.5 to about 16 inches. The basepipe 210 may have any suitable axial length along the axis of the string 130, including an axial length of about 2 to about 40 feet, and more particularly about 4 to about 20 feet. The basepipe may be formed from any suitable material, including various grades of carbon and stainless steel, as well as other high strength, corrosion-resistant Ni-base, Ni—Fe-base, Co-base, and Fe-base alloys, including various Ni-base, Ni—Fe-base, Co-base, and Fe-base superalloys. The basepipe 210 has a pipe wall 220 having a wall thickness of about 0.3 to about 1.0 inches. The basepipe 210 includes at least one orifice 102 and corresponding bore 108 that extends through the pipe wall 220 from an outer surface 230 to an inner surface 240.

The basepipe assembly 200 also includes a selectively removable plug 10, as described herein, sealingly disposed in the orifice 102. The selectively removable plug 10 includes a selectively removable plug body 12 formed of a plug body material 14 and a selectively removable sealant coating 16 formed of a coating material 18 disposed on an outer surface thereof, as described herein.

The basepipe assembly 200 also includes a screen 250 disposed on a portion of the outer surface 230 of the basepipe 210 and attached to the outer surface 230 about a periphery 232 thereof, the orifice 102 disposed under the screen 250 so that the screen filters particulates 262 in the wellbore fluid 60 flow through the outer surface 252 of the screen 250 and are filtered thereby, such as wellbore fluids 60 flowing within and from the annulus 254, or fluid flow path 255 or conduit, formed between the inner diameter 144 and surface of the well casing 140 and the outer surface 230 of the basepipe 210 or wellbore fluids 60 flowing into the annulus 254 from the earth formation 260 through a perforation 264 in the well casing 140, to prevent the orifice from being clogged and closed by the particulates 262. The attachment of the screen 250 may be attached to the basepipe by any suitable attachment mechanism, including a peripherally or circumferentially-extending weld bead 272 that seals the periphery 232 of the screen to prevent ingress of the particulates 262 under the periphery of the screen 250. The screen 250 may be any suitable screen type, including, for example, various mesh, wire-wrap and slotted screens (not shown). The screen 250 may be attached directly to the outer surface 230 of the basepipe 210 or to an intermediate member 270 or members, such as a radially extending flange or other standoff that is in turn attached to the outer surface 230 of the basepipe 210, such as by a peripheral or circumferential weld 272. The screen 250 is disposed on the outer surface 230 of the basepipe 210 to define a second annulus 280 that defines a fluid flow path 281 or conduit between the inner surface 256 of the screen 250 or other adjoining tubular members 258 and the outer surface 230 of the basepipe. The second annulus 280 may be used, for example, to perform a gravel pack operation where gravel pack fluid 294, such as gravel pack fluid 294 pumped downwardly from the earth's surface, which includes particulates 262 flows through the first annulus 254 through the screen 250 that filters the particulates 262 and returns the filtered gravel pack fluid 294' through the second annulus 280, such as returning the filtered gravel pack fluid 294' to the earth's surface. The basepipe assembly 200, including the basepipe 210, plug 102 and screen, is configured for disposition within the inner diameter 144 of the well casing 140 to define the first annulus 254 and second annulus 280.

The downhole basepipe assembly 200 will include at least one orifice 102 in the basepipe 210, and in an exemplary embodiment includes a plurality of orifices 102 and the selectively removable plug 10 includes a corresponding plurality of selectively removable plugs 10, each sealingly disposed in a corresponding orifice 210. The plurality of orifices 102 are arranged in a predetermined pattern 103 and have a plurality of predetermined orifice sizes. Any suitable predetermined pattern of orifices 102 may be used including circumferentially-spaced, axially-extending rows of spaced orifices 102 as shown in FIG. 3. In another embodiment, the predetermined pattern may include circumferentially-spaced, axially-extending rows of spaced orifices 102 as shown in FIG. 3, where adjacent axial rows are axially offset by a predetermined axial offset, such as about one-half the axial distance between axially adjacent orifices 102 in order to increase the axial and torsional strength and stiffness of the basepipe 210. In one embodiment, the predetermined pattern 103 may include a predetermined number of orifices 102 per axial foot, including about 40-100 orifices per axial foot, more particularly about 40 to about 70 per axial foot, and more particularly about 40 to about 60 orifices per axial foot, and the orifices may have the same size and/or shape, or different sizes and/or shapes. The orifices 102 may have the same size and cross-sectional shape or a plurality of different sizes and cross-sectional shapes. The predetermined pattern 103, including the number, sizes and cross-sectional shapes, may also be configured to provide a predetermined pressure drop relative to fluid flow through an adjacent perforation 264, or plurality of perforations 264, in the well casing 140 and adjacent earth formation 260 that is part of a perforation zone defined by the axial length of the basepipe 210. For example, in one embodiment the predetermined pattern 103, including the number, sizes and cross-sectional shapes, may be configured to provide a maximum pressure drop in any one of the orifices 102 that does not exceed a predetermined amount. In another embodiment, the predetermined pattern 103, including the number, sizes and cross-sectional shapes, may be configured to provide a minimum total pressure drop associated with the sum of the pressure drops of the respective orifices 102. In yet another embodiment the predetermined pattern 103, including the number, sizes and cross-sectional shapes, may be configured to provide a predetermined maximum distance of at least one of the orifices 102 to an adjacent perforation 264 that does not exceed a predetermined distance. In general, the predetermined pattern 103 may be configured to improve the fluid flow rate from a reservoir associated with the adjacent earth formation 260 into the basepipe 210 as compared with basepipe assemblies that employ a sliding sleeve to shutter the orifices 102, by increasing the number of orifices 102 that may be incorporated into the basepipe 210 per unit of length, and more particularly by increasing the number of orifices by about 30 to about 200% per unit of length, and more particularly about 50 to about 150%, and even more particularly about 75 to 125%.

The downhole basepipe assembly 200 may also include an upper packer 290 located uphole of the screen 250 and a lower packer 292 disposed downhole of the screen 250, wherein the upper packer 290 and lower packer 292 are configured to form a fluid seal 50 between the basepipe 210 and the well casing 140, and in one embodiment between the outer surface 230 of the basepipe and the inner diameter 144 and surface of the well casing 140. The upper packer 290 and lower packer 292 may be of conventional construction other than their incorporation into the novel basepipe assembly 200.

Figure 1G:
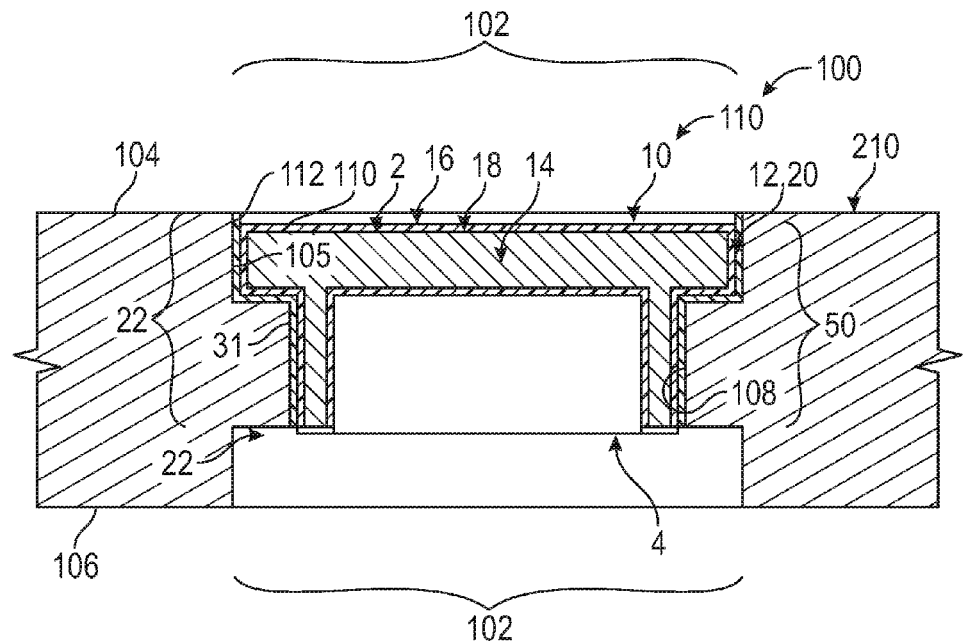
Figure 2:
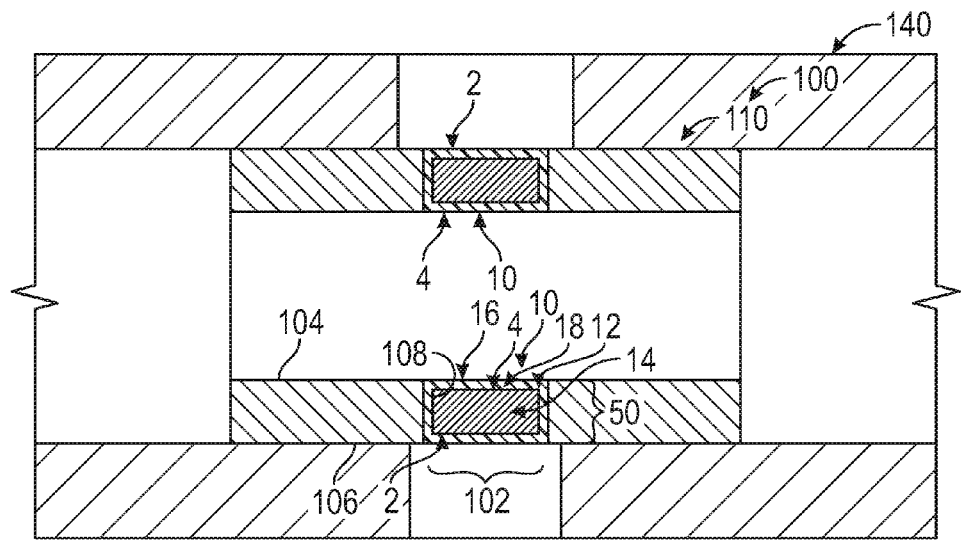
FIG. 2 is a cross-sectional view of an exemplary embodiment of an article, such as a downhole article, including a downhole tool or component, having a selectively openable orifice.

The orifice 102 or orifices formed in the basepipe 210 may be formed by any suitable method, including various forms of drilling or machining. The orifice 102 or orifices may also include various features 105 that may be provided within the bore 108, and that may be located along the length of the bore 108 or proximate the first surface 104 or the second surface 106 of the article 100, or any combination thereof. The features may be formed by any suitable feature forming method, including, without limitation, abrading, machining, drilling, piercing, deforming or otherwise forming the feature 105 in the article 100 and orifice 102, and including combinations of these methods. In one embodiment, the feature 105 may include an axially-extending slot or keyway 112 that is configured to engage a key 110 (FIG. 1G). In another embodiment, the feature 105 may include a recess 111, such as a circumferential groove 113 (FIG. 1F), which is disposed within the bore 108 and configured to engage a mating feature formed on the fastener plug 10. In another embodiment, the feature 105 includes a counterbore 107 (FIG. 1A) or countersink 109 (FIG. 1F) proximate the first surface 104 and/or the second surface 106 of the article 100, or in a basepipe 210 proximate the outer surface 230 and/or the inner surface 240. In one embodiment, the counterbore 107 or countersink 109 is configured to receive a protruding head 44 of the fastener plug 10. The counterbore 107 or countersink 109 and protruding head 44 may be shaped and sized so that the protruding head 44 is flush with or recessed within the first surface 104 and/or the second surface 106 of the article 100, or in a basepipe 210 flush with or recessed within the outer surface 230 and/or the inner surface 240. These configurations are very desirable because space within a wellbore and well casing 140 is always at a premium and the complexity of the downhole tools and components used within the wellbore frequently must enable sliding movement of one surface over another surface, or movement of one device past the surface of another device in close proximity, or enable fluid flow over a particular surface with minimum pressure losses or opportunity to trap particulates in the fluid flow so as to cause an obstruction. As such, it is very important to design the downhole tools 112 and components 114, such as basepipe assembly 200 and selectively removable plugs 10 for flush or recessed mounting so as to accommodate the sliding or close proximity movement of other downhole tools components, or promote fluid flow over the surface. Further, it is very advantageous to design the orifices 102 and the mating fastener plugs 10 to protect the plugs from mechanical damage from other tools and components that are sliding over or moving proximate to these surfaces, or from abrasion due to the high flow rate of fluids that may contain particulates over these surfaces. In some embodiments, the sealant coating 16 and coating material 18 are relatively soft and susceptible to mechanical damage from other downhole tools and components or abrasion from the high flow rate of fluids that include abrasive particulates. These aspects are very desirable and advantageous because in order to maintain the closure of the orifice 102 for a predetermined time, including for an indeterminate or indefinite period of time as described herein, it is very important to during this time to maintain the integrity of the sealant coating 16 to avoid contact of wellbore fluids 60 with the plug body 12.

In certain embodiments it may also be desirable to coat the article 100, such as basepipe 210, with a sealant coating material, which may be any suitable sealant coating material including sealant coating material 18, before and/or after disposing the fastener plug 10 or plugs to ensure the integrity and protection of the sealant coating 16.

In one embodiment, for example, a layer of a sealant coating material, such as sealant coating material 18, may be applied over an exposed end 46 (FIG. 1A) of the fastener plug 10 and the surrounding surface of the article 100 after its installation into the orifice 102. In another embodiment where the article 100 includes a basepipe 210, an outer layer 234 (FIG. 1A) of a sealant coating material, such as sealant coating material 18, is disposed on and sealingly covering an outer exposed end 46 of the selectively removable plug 10 and the outer surface 230 surrounding the outer exposed end 46. In yet another embodiment, where the article 100 includes a basepipe 210, an inner layer 236 (FIG. 1A) of a sealant coating material, such as sealant coating material 18, is disposed on and sealingly covering an inner exposed end 46 of the selectively removable plug 10 and the inner surface 240 surrounding the inner exposed end 46. The sealant coating material, such as sealant coating material 18, may be applied to all of surfaces of the article 100, such as a basepipe, including the surface of the bores 108, either before or after installation of the fastener plug 10. Alternately, the sealant coating material, such as sealant coating material 18, may be applied only to portions of the surfaces of the article 100, such as a basepipe 210, surrounding the orifices 102 (and the fastener plugs 10 if they have been installed), including the surface of the bores 108, either before or after installation of the fastener plug 10. In one embodiment, the sealant coating material, such as sealant coating material 18, may be applied to the surface of the bores 108 and provides an orifice layer 109 of the sealant coating material disposed on and sealingly covering a surface of the orifice 102 extending between the first surface 104 and the second surface 106 of the article 100, or in a basepipe 210 between the outer surface 230 and the inner surface 240.

The selectively removable fastener plug 10 must be sealingly engaged and disposed in the orifice 102 and configured to provide a fluid seal 50 up to a predetermined operating pressure or pressure differential that is sufficient to maintain fluid isolation of pressurized or unpressurized (i.e. ambient pressure) fluids within the first surface 104 and the second surface 106 of the article 100, or in a basepipe 210 between fluids in fluid contact with the outer surface 230 and the inner surface 240. In one embodiment, the fluid seal 50 is configured to seal the orifice 102 and operate at a predetermined operating pressure or pressure differential between the respective surfaces of at least about 10,000 psi, more particularly about 13,000 psi, and even more particularly about 15,000 psi.

The selectively removable fastener plugs 10 disclosed may be used in any suitable application, particularly incorporation into various articles 100 including downhole articles 110, such as various downhole tools 112 and components 114, particularly a basepipe assembly 200. The downhole articles 110 are useful in a variety of downhole applications that require the ability to open an orifice 102 at a predetermined time, such as a predetermined time selected by an operator, where the later time is unknown or indeterminate or indefinite at the time that the downhole article 110 is placed into service downhole. The duration of the time interval between placement of the downhole article downhole the predetermined time at which the orifice is to be opened may include any suitable interval, including minutes, hours, days, weeks, months and even a year or more. Further, once the predetermined time has been established or selected, it is desirable to open the orifice 102 within a relatively short opening interval, including a maximum time interval. In certain embodiments, it is desirable that the maximum time interval to open the orifice 102 or orifices 102 is relatively short, including within minutes, hours or days, such as, for example, 730 to 1 days, and more particularly within about 24 to about 1 hours, and more particularly about 60 to about 15 minutes. In one embodiment, a method 300 of opening an orifice 102 in a downhole article 110 is disclosed. The method includes forming 310 an article having an orifice 102, the orifice having a selectively removable plug 10 sealingly disposed therein, the selectively removable plug comprising a selectively removable plug body 12 formed of a plug body material 14 and a selectively removable sealant coating 16 formed of a sealant coating material 18 disposed on an outer surface 19 thereof, as described herein. The method 300 also includes disposing 320 the downhole article 110 within a wellbore. The method 300 further includes exposing 330 the selectively removable plug 10 to a first wellbore fluid 60, 80 that is configured to selectively remove the sealant coating 16 and provide a fluid access to the plug body 12. Still further, the method 300 includes exposing 340 the selectively removable plug body 12 to a second wellbore fluid 60, 70 through the fluid access that is configured to selectively remove the plug body 12 and thereby open the orifice 102.

Method 300 includes forming 310 an article having an orifice 102, the orifice having a selectively removable plug 10 sealingly disposed therein, the selectively removable plug comprising a selectively removable plug body 12 formed of a plug body material 14 and a selectively removable sealant coating 16 formed of a sealant coating material 18 disposed on an outer surface 19 thereof, may include any suitable article 100 as described herein, including various downhole articles 110, as described herein. In one embodiment, forming 310 the article comprises forming a basepipe assembly 200, including a basepipe 210, configured for disposition within an inner diameter 144 of a well casing 140, wherein the basepipe includes the orifice 102. Forming the basepipe assembly 200, including the basepipe 210, having the orifice 102 includes attaching the periphery 232 of the screen 250 disposed on or covering a portion of the outer surface 230 thereof, as described herein. Attaching the screen 250 is performed as described herein so that the orifice 102 extends through the wall 220 of the basepipe 210 from an inner surface 240 to the outer surface 230 and the orifice 102 (or orifices 102) is located within the portion of the outer surface 230 covered by the screen 250. Forming 310 the downhole article 110 and orifice 102 may include forming a plurality of orifices 102 and the selectively removable plug 10 may include a plurality of selectively removable plugs 10 each sealingly disposed in a corresponding orifice 102. In one embodiment, forming 310 includes forming the plurality of orifices 102 so they are arranged in a predetermined pattern 103 and have a plurality of predetermined orifice sizes that are configured to provide a predetermine pressure drop of a wellbore fluid 60 flowing to or from a perforation 264 through a casing wall in the well casing 140 proximate the predetermined pattern 103, as described herein.

The method 300 includes disposing 320 the downhole article 110 within a wellbore. This may performed in any suitable manner of placing the downhole article 110 within the wellbore, including the use of various wireline, slickline and other conventional string 130 installation and placement tools. In one embodiment, disposing 320 the downhole article 110 within a wellbore comprises disposing a string comprising the basepipe 210 within the well casing 140. Disposing 320 may also include placing an upper packer 290 located uphole of the screen 250 and a lower packer 292 disposed downhole of the screen, wherein the upper packer and lower packer are configured to form a fluid seal 50 between the outer surface 230 of the basepipe 210 and the inner diameter 144 of the well casing 140 and thereby isolate a corresponding zone of an earth formation 260 for well completion or production.

The method 300 further includes exposing 330 the selectively removable plug 10 to a first wellbore fluid 60, 80 that is configured to selectively remove the sealant coating 16 and provide a fluid access to the plug body 12. In one embodiment, exposing 330 the selectively removable plug 10 to a first wellbore fluid 60, 80 includes exposing the selectively removable plug 10 to a basic wellbore fluid 80. Any suitable basic wellbore fluid 80 compatible with the other wellbore operations and other wellbore tools and components may be utilized. In one embodiment, the basic wellbore fluid 80 may include an organic or inorganic basic fluid. In another embodiment, the basic wellbore fluid 80 comprises basic wellbore fluids having a pH of ≥7, more particularly 8 or more, and more particularly 9 or more, and even more particularly 10 or more. Examples include various hydroxides, including sodium hydroxide and potassium hydroxide. It is desirable, for example, that the basic wellbore fluid 80 be used in conjunction with another predetermined wellbore operation so that a synergy may be realized between exposing 330 and another wellbore operation, such as, for example, breaking the viscosity of a wellbore fluid 60 used for another purpose in another completion or production operation. In one embodiment, a gravel pack 263 operation may be performed to establish a gravel pack 263 of particulates 262 in the annulus 254 and exposing 330 is performed to complete the gravel pack 263 operation or after the gravel pack 263 has been established (e.g. as part of well completion).

Still further, the method 300 includes exposing 340 the selectively removable plug body 12 to a second wellbore fluid 60, 70 through the fluid access that is configured to selectively remove the plug body 12 and thereby open the orifice 102. In one embodiment, exposing 340 the selectively removable plug 10 to a second wellbore fluid 60, 70 different than the first wellbore fluid 60, 80 through the fluid access includes exposing a surface of the plug body 12 to an acidic wellbore fluid. Any suitable acidic wellbore fluid 70 compatible with the other wellbore operations and other wellbore tools and components may be utilized. In one embodiment, the acidic wellbore fluid 70 may include an organic or inorganic acidic fluid. In another embodiment, the acidic wellbore fluid 70 comprises acidic wellbore fluids having a pH of <7, more particularly 6 or less, and more particularly 5 or less, and even more particularly 3 or less. Examples include hydrochloric acid, for example. It is desirable, for example, that the acidic wellbore fluid 70 be used in conjunction with another predetermined wellbore operation so that synergy may be realized between exposing 340 and another wellbore operation, such as, for example, an acidizing or acid wash operation used for another purpose in another completion or production operation. In one embodiment, the acidic wellbore fluid includes hydrochloric acid (HCl), more particularly, by volume, at least about 10% HCl, and more particularly, by volume, at least about 15% HCl. In one embodiment, for example, exposing 340 a surface of the plug body 12 to an acidic wellbore fluid 70 is done in conjunction with a wellbore acidizing operation, and more particularly in conjunction with a wellbore acidizing operation performed in conjunction with well completion or production. In one embodiment, after the gravel pack operation has been performed to establish a gravel pack 263 in the annulus 254 and exposing 330 has been performed on the coating layer 16, exposing 340 is performed to remove the plug body 12 (or bodies 12) and open the orifice 102 (or orifices 102) to allow wellbore fluid from the earth formation 260 to flow into the basepipe 210 and uphole to the earth surface (e.g. as part of well production).

The examples of the first wellbore fluid 60, 80 and second wellbore fluid 60,70 described herein are merely exemplary. Many different downhole wellbore fluids 60 are used during drilling completion and production operations and the fasteners plugs 10 and downhole articles 110 described herein may be used during any downhole operation with any suitable combination of first wellbore fluid 60, 80 and second wellbore fluid 60,70.

In additional embodiments, as shown in FIGS. 5-9, the method 300 described above can be utilized with additional embodiments of a selectively removable fastener plug 10 configurations, as follows. The selectively removable fastener plug 10 may also incorporate a fastener jacket 90 formed from a fastener jacket material 92. The fastener jacket 90 can have any suitable external fastener configuration, including those described herein and illustrated in FIGS. 1A-1G. The fastener jacket 90 is configured to provide a fastener mechanism for sealable engagement of the selectively removable fastener plug body 96 within the orifice 102 and bore 108 to provide an outer fluid seal 91 between the fastener jacket 90 and the bore 108. The fastener jacket 90 is also configured to provide a sealed housing 94 for the selectively removable plug body 96 formed from a selectively removable plug body material 98 and a selectively removable inner fluid seal 93 to isolate the plug body 96 from wellbore fluids 60 until it is desirable to remove the seal 93 by exposure to the first wellbore fluid 80. The plug body material 98 may include the same plug body materials listed herein for plug body material 14, for example.

The fastener jacket 90 may be formed from any suitable jacket material 92, which in downhole applications may include various grades of coated and uncoated steel and stainless steel, brass and the like, for example. The fastener jacket 90 may employ any suitable fastener mechanism for attachment to the article 100, including a downhole article 110, such as basepipe assembly and basepipe 210. In one embodiment, the fastener jacket 90 may be formed in one piece (not shown), and in other embodiments as a plurality of pieces that are configured for sealable mating engagement with one another, such as the two piece embodiment as shown in FIGS. 5-9. In this embodiment, fastener jacket 90 includes an upper or outer jacket member 88 and a lower or inner jacket member 86. The upper jacket member 88 includes the fastener mechanism for attachment to the bore 108.

The upper jacket member 88 includes and forms an upper housing portion 87 and the lower jacket member 86 includes and forms a lower housing portion 85. When the lower jacket member 86 is threaded into the upper jacket member 88, the upper housing portion 87 and lower housing portion 85 together form the housing chamber 84 that in conjunction with the inner fluid seal 93 provides the sealed housing 94 for and captures the plug body 96. The upper housing portion 87 and lower housing portion 85 may be sized so that their threaded engagement compresses the plug body 96 within the housing chamber 84 and forms the inner fluid seal 93, as described below. The upper housing portion 87 and lower housing portion 85 may have any suitable configuration for capturing the plug body 96, including the respective axially-inwardly tapering surfaces 77, 75 that taper axially inwardly toward the central portion 73 of the housing chamber 84. In one embodiment, the surfaces 77, 75 each may be frustoconical in shape. The surfaces 77, 75 are configured to engage the outer surface 69 of the plug body 96, including any coating layer applied thereto, as described herein. In one embodiment, as shown in FIGS. 5, 6, 7 and 8, plug body 96 includes a fluid sealant coating layer 97 of a fluid sealant coating material 99 on the outer surface thereof. In this embodiment, compression of the upper housing portion 87 and upper surface 77 and lower housing portion 85 and lower surface 75 against the coating material 99 as the threaded portion 73 on the outer diameter of the lower jacket member 86 is threaded into the mating threaded portion 71 on the inner diameter of the upper jacket portion 88 compresses the upper surface 77 and the lower surface 75 against the outer surface 69 of the fluid sealant coating layer 97 and fluid sealant coating material to form the inner fluid seal 93. The upper housing portion 87 and upper surface 77 and lower housing portion 85 and lower surface 75 and outer surface 69 and plug body 96 may have any suitable matingly engageable shapes for forming the inner fluid seal 93. In another embodiment (not shown), the upper housing portion 87 and upper surface 77 and lower housing portion 85 and lower surface 75 may include a right cylindrical form with an upper and lower shoulder and outer surface 69 and plug body 96 may also include a mating right cylindrical form such that the upper and lower shoulders are compressed against upper and lower circular portions of outer surface 69, for example.

Figure 9:
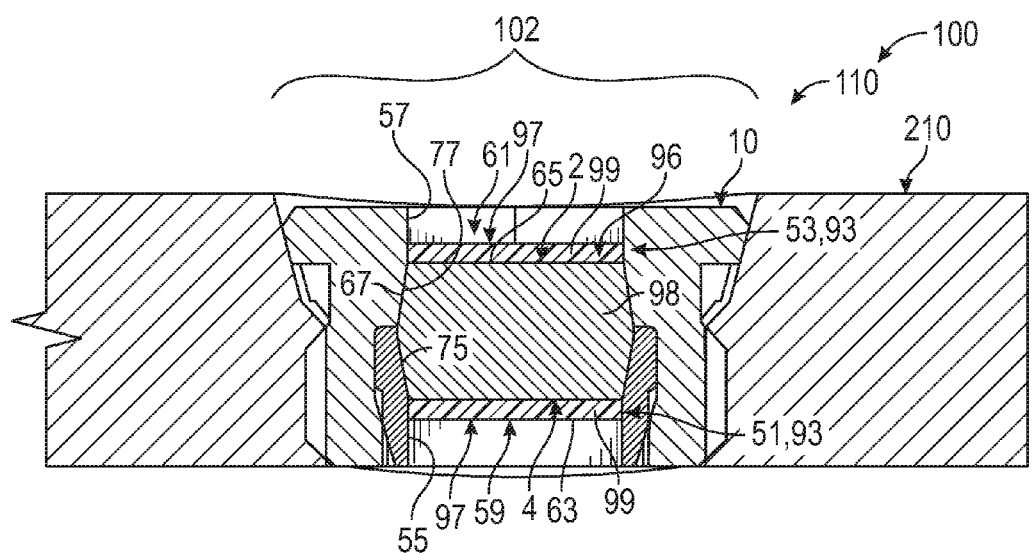
FIG. 9. is an exemplary cross-sectional view of an embodiment of a selectively removable fastener plug for disposition in and closing of an orifice of an embodiment of an article, such as a downhole article comprising a basepipe assembly, and subsequent selective removal.
Figure 10A:
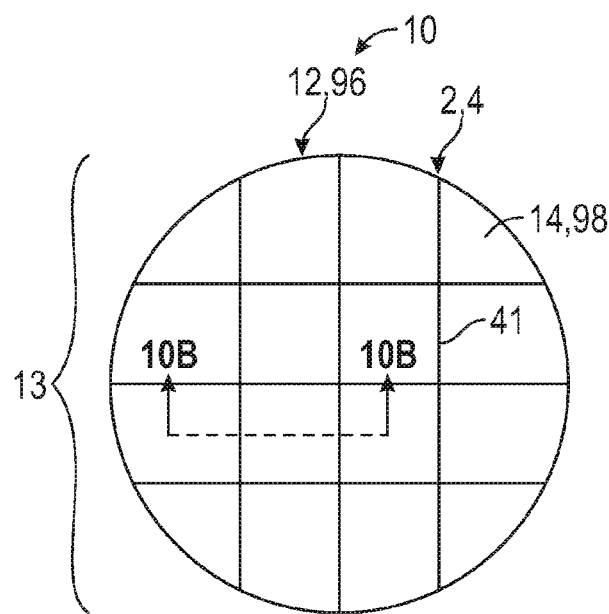
FIG. 10A is a schematic end view illustration of an embodiment of a plug body including a non-planar portion and surface texture.
Figure 10B:
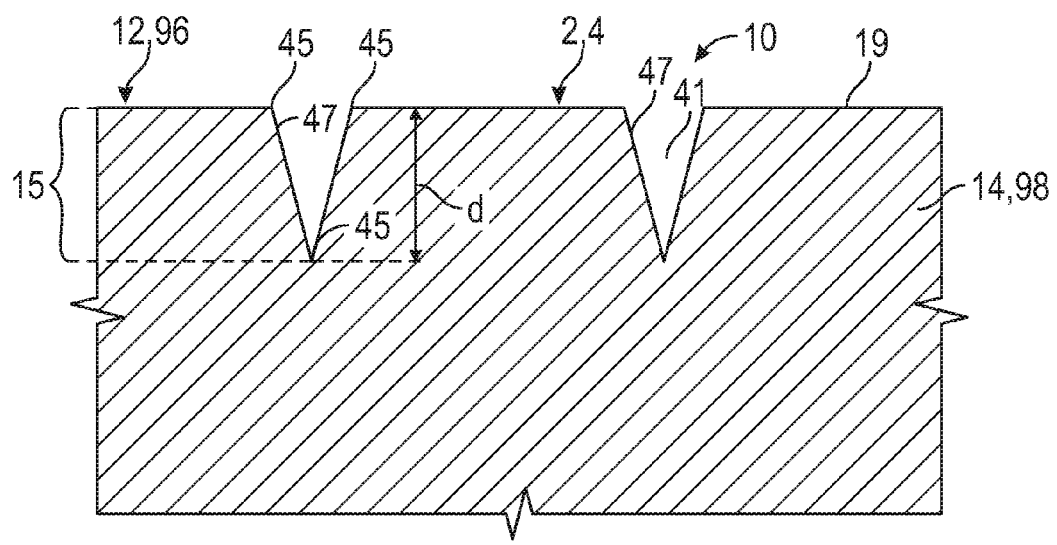
FIG. 10B is a cross-sectional view of section 10B of FIG. 10A.
Figure 11A:
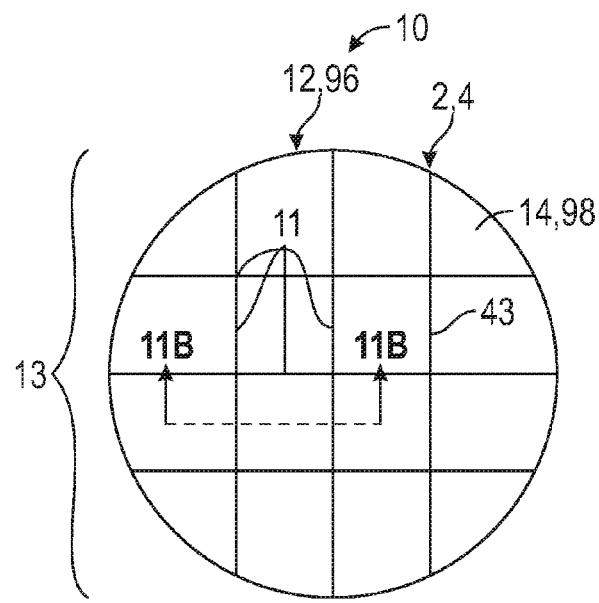
FIG. 11A is a schematic end view illustration of another embodiment of a plug body including a non-planar portion and surface texture.
Figure 11B:
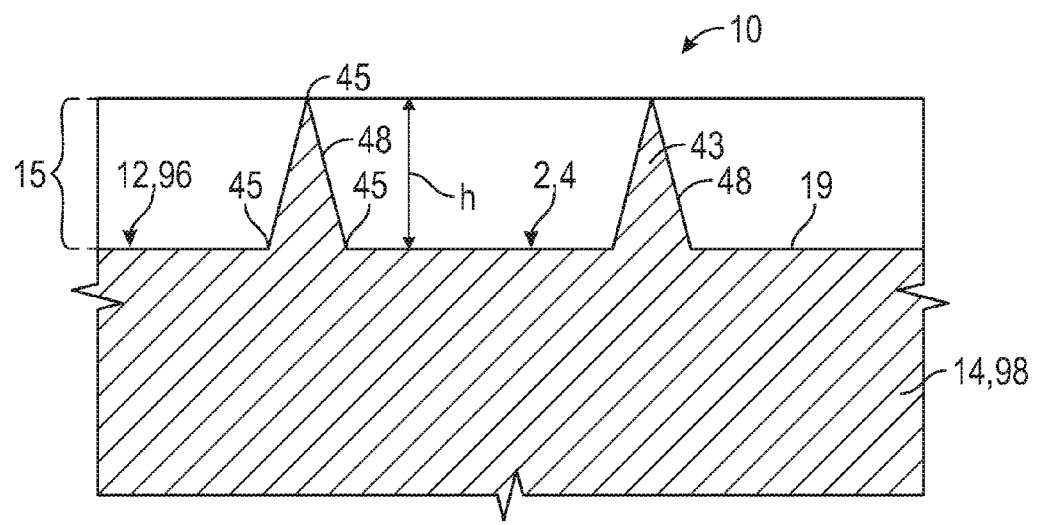
FIG. 11B is a cross-sectional view of section 11B of FIG. 11A.

In one embodiment, as shown in FIG. 9, the upper jacket member 88, lower jacket member 86 and plug body 96 may have the same shapes as described above, and be configured for assembly in the manner described above, with the exception that the plug body 96 does not include a fluid sealant coating layer 97 on the outer surface 67. In this embodiment, a fluid sealant coating material 99 is located at an upper end 65 and a lower end 63 of the plug body 96 as an upper layer 61 and a lower layer 59 that respectively are disposed within the upper bore 57 and lower bore 55 to form upper seal portion 53 and lower seal portion 51 of inner fluid seal 93 to sealingly dispose the plug body 96 and plug body material 98 within the housing chamber 84.

The fluid sealant coating material 99 and the upper layer 61 and a lower layer 59 may be installed in any suitable manner. The upper layer 61 and a lower layer 59 may be applied to the upper end 65 and a lower end 63 of the plug body 96 prior to assembly. Alternately, they may be applied to the upper end 65 and a lower end 63 of the plug body 96 after assembly of the plug body into the housing chamber 84. The upper layer 61 and a lower layer 59 may also be inserted as part of the upper jacket member 88 and lower jacket member 86, either before or after assembly of these members to one another.

The fluid sealant coating material 99 may be any suitable material, including the materials described herein for fluid sealant coating material 18. In one embodiment, the fluid sealant coating material 99 includes various selectively removable polymer materials that may be removed as described herein by exposure to a wellbore fluid 60, such as a basic wellbore fluid 80.

In another embodiment, the fluid sealant coating material 99 may include any metal or metal alloy that may be removed by exposure to a basic wellbore fluid 80, and more particularly including any transition or refractory metal that may be removed by exposure to a basic wellbore fluid 80. Suitable refractory metals include niobium or tantalum, or alloys or other combinations thereof. The metal fluid sealant coating material 99 may also be employed as fluid sealant coating material 18 in all of the various embodiments described herein. The metal fluid sealant coating material 99 may be employed as a coating layer that is disposed on the entire outer surface of the plug body 12 or plug body 96 by any suitable method, including deposition by plating, chemical or physical vapor deposition, thermal or electron-beam evaporation, sputtering, pulsed layer, or atomic layer deposition or the like.

Figure 5:
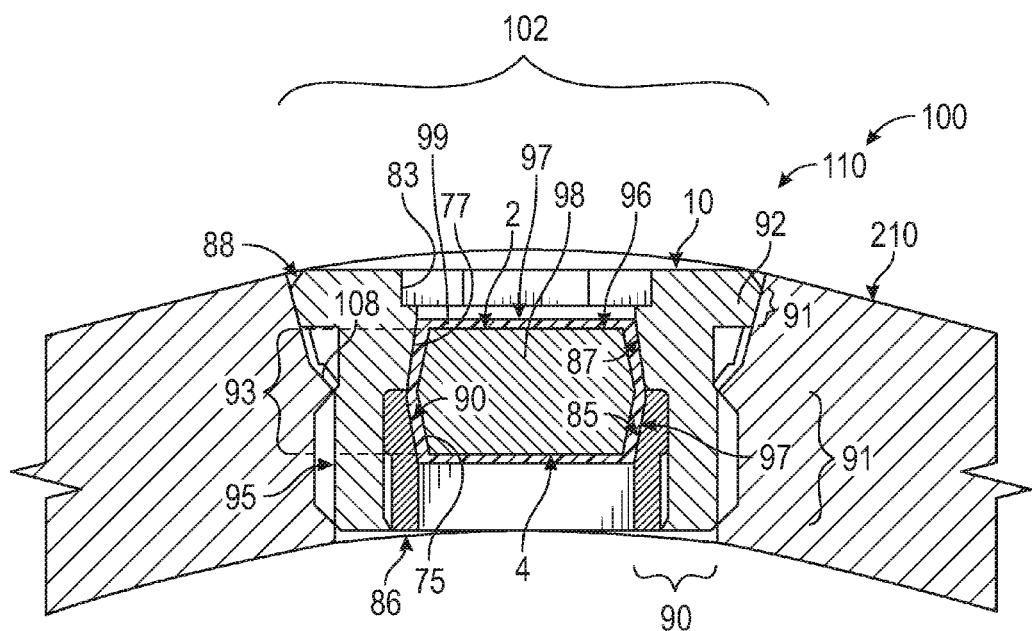
FIG. 5. is an exemplary lateral cross-sectional view of an embodiment of a selectively removable fastener plug for disposition in and closing of an orifice of an embodiment of an article, such as a downhole article comprising a basepipe assembly, and subsequent selective removal.
Figure 6:
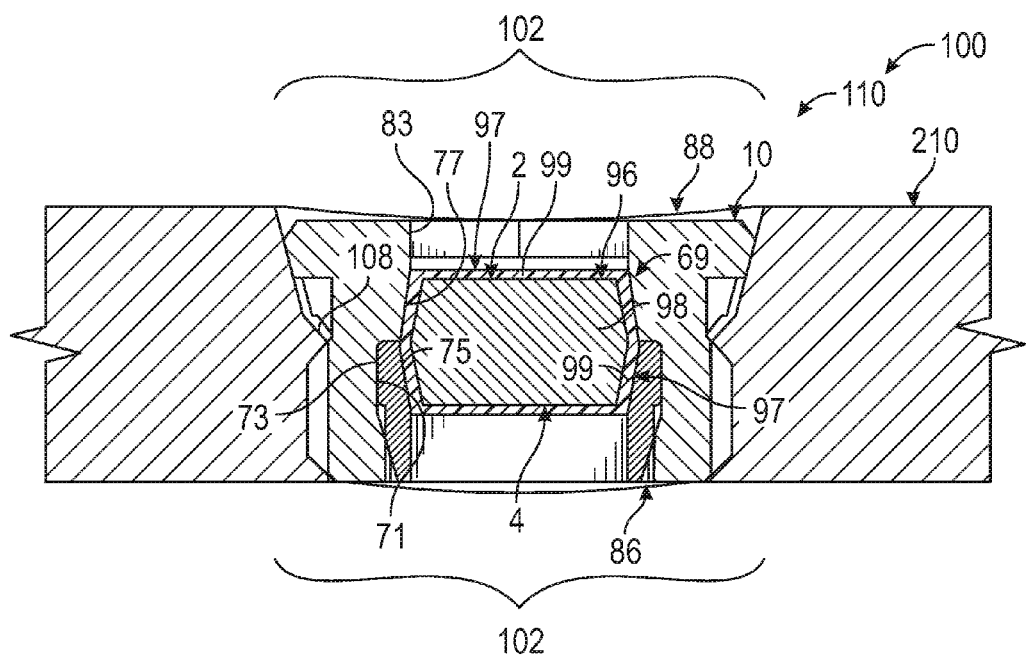
FIG. 6 is a cross-sectional view of the embodiments of FIG. 5 that is orthogonal to the view of FIG. 6.
Figure 7:
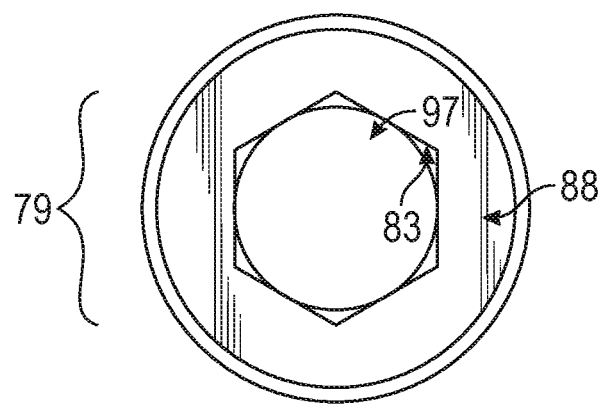
FIG. 7 is a top view of the embodiment of the selectively removable plug of FIG. 5.
Figure 8:
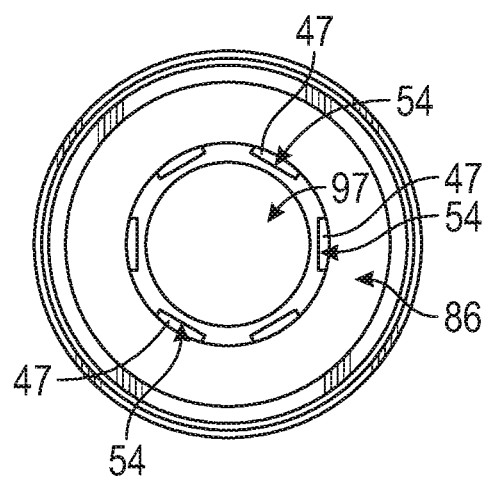
FIG. 8 is a bottom view of the embodiment of the selectively removable plug of FIG. 5.

In one embodiment, the fastener mechanism may include a threaded portion 95 of the upper jacket member 88 that is configured to engage mating threads located in the bore 108 as shown in FIGS. 5, 6 and 9. Any suitable seal 91 may be employed. In one embodiment, the outer surface of the fastener jacket may be configured to contact the bore 108 to provide the outer fluid seal 91 by a compression fit. In other embodiments, the seal 91 may be provided using additional sealing members, such as compliant washers or O-rings, or by application of a sealant material to the threaded portion 95 or the mating threads of the bore 108, or both. The fastener mechanism for sealable engagement of the selectively removable fastener plug 10 within the orifice 102 and bore 108 to provide an outer fluid seal 91 between the fastener jacket and the orifice. The upper jacket member 88 also includes a driving feature 83 on an upper end 81 that may be used to insert the upper jacket member 88 into the article 100, such as basepipe 210. The driving feature may be any of the driving features 34 described herein, including the hexagonal recess 79 shown in FIGS. 5, 6, 7 and 9, for example.

The lower jacket also includes a driving feature 54 on a lower end 49 that may be used to insert the lower jacket member 86 into the upper jacket member as described herein. The driving feature 54 may be any of the driving features 34 described herein, including the spanner wrench recesses 47 shown in FIG. 8, for example.

In one embodiment, the fastener plug 10 includes a selectively removable plug body 12 formed of a selectively removable plug body material 14. The fastener plug 10 also includes a selectively removable sealant coating 16 comprising a selectively removable coating material 18 disposed on an outer surface 19 of the plug body 12. The outer surface 19 of the plug body 12 includes a non-planar portion 13 that defines a surface texture 15 that is configured to promote the separation of the corresponding portion 17, also a non-planar portion, of the sealant coating 16 that is disposed on the non-planar portion 13 of the plug body 12 to separate into a plurality of pieces 21 once the underlying plug body 12 is removed, as described herein. The non-planar portion 13 of the plug body 12 and the surface texture 15 may be provided before or after the sealant coating 16 is deposited on the outer surface of the plug body 12. In one embodiment, the non-planar portion 13 and the surface texture 15 is formed prior to depositing the sealant coating 16 on the plug body 12. The portion 17 of the sealant coating 16 conforms to the outer surface 19 of the plug body 12, particularly in the non-planar portion 13, and defines a shape 11 of the sealant coating 16 and portion 17. The shape 11 of the sealant coating 16 is configured to promote separation of the coating 16 into pieces 21 upon exposure of the liberated sealant coating 16' to a wellbore fluid, as explained further herein. The shape 11 of the sealant coating 16 provided by the non-planar portion 13 and surface texture 15 of the plug body 12 that promotes the separation of the liberated sealant coating 16' into pieces 21 by a wellbore fluid is very advantageous because it promotes enhanced flow of wellbore fluids through the orifice 102 and points downstream of the orifice 102, as well as promoting enhanced operating fluid pressures at these locations. In one embodiment, for example, the separation of the liberated sealant coating 16' into pieces 21 by a wellbore fluid is very advantageous because it allows downstream articles, such as various screens 250, fluid passageways 254,280, gravel packs 263 to continue to operate as designed, including ensuring a fluid flow path 288 into and out of an earth formation 260 adjacent to the fastener plug 10 and orifice 102. In particular, the separation of the liberated sealant coating 16' into pieces 21 by a wellbore fluid is very advantageous because it enables the pieces 21 to pass through the articles described, such as downhole screens 250 as described herein, including, for example, various mesh, wire-wrap and slotted downhole screens. The screens may have any suitable opening size, including an opening size, including a slot width for slotted openings, of about 150 µm to about 950 µm. The pieces 21 may have any suitable size that promotes their passage through the downstream articles mentioned. The separation of the liberated sealant coating 16' into pieces 21 by a wellbore fluid is also very advantageous because it prevents the screen from becoming completely or partially clogged by the liberated sealant coating 16', or a plurality of liberated sealant coatings 16' where a plurality of removable fastener plugs 10 are employed within a tubular screen section of the string, as shown, for example, in FIG. 3.

Figure 13A:
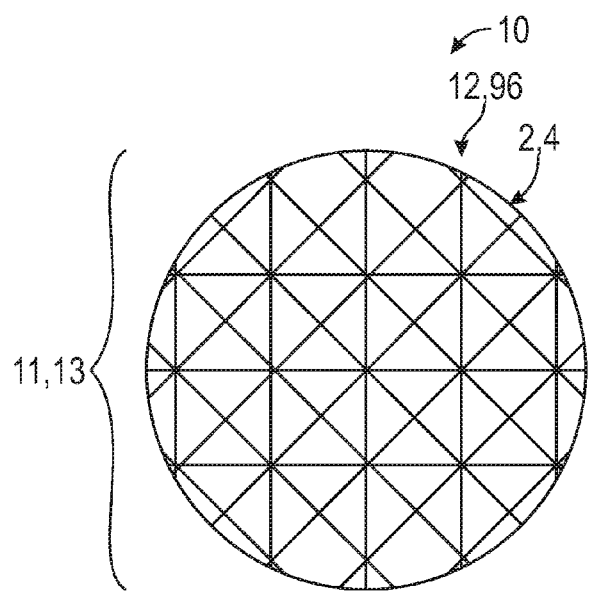
FIGS. 13A-G are a plurality of embodiments of a plug bodies including non-planar portions and surface textures, as described herein.
Figure 13B:
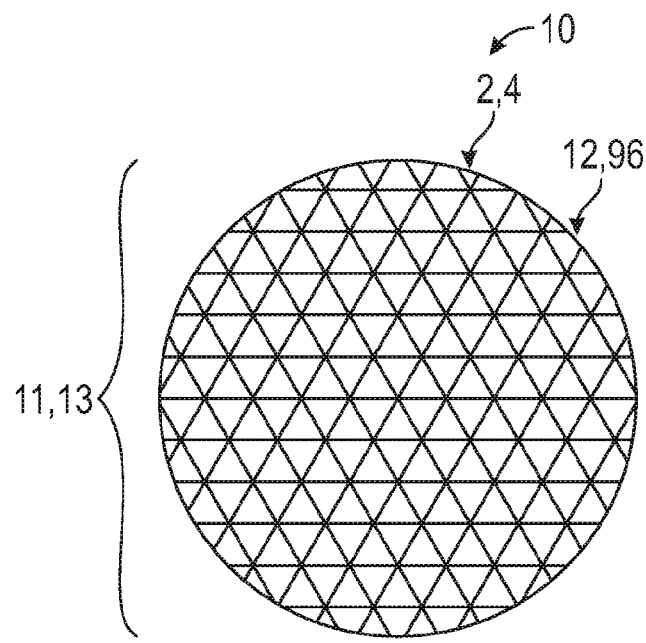
Figure 13C:
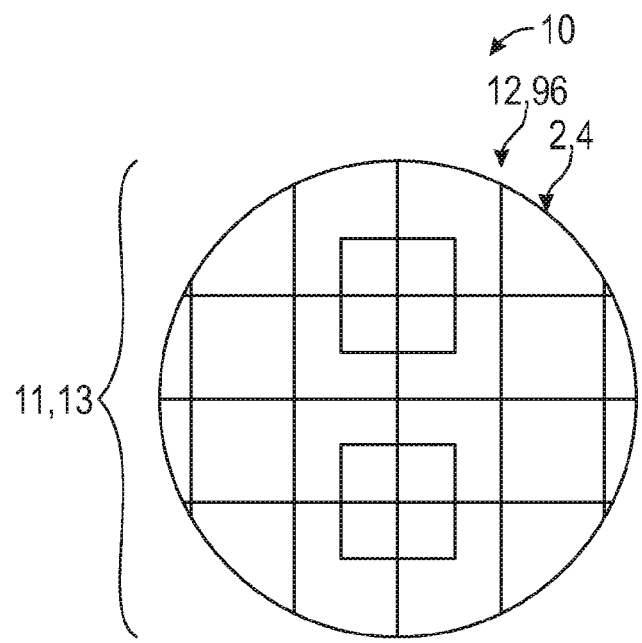
Figure 13D:
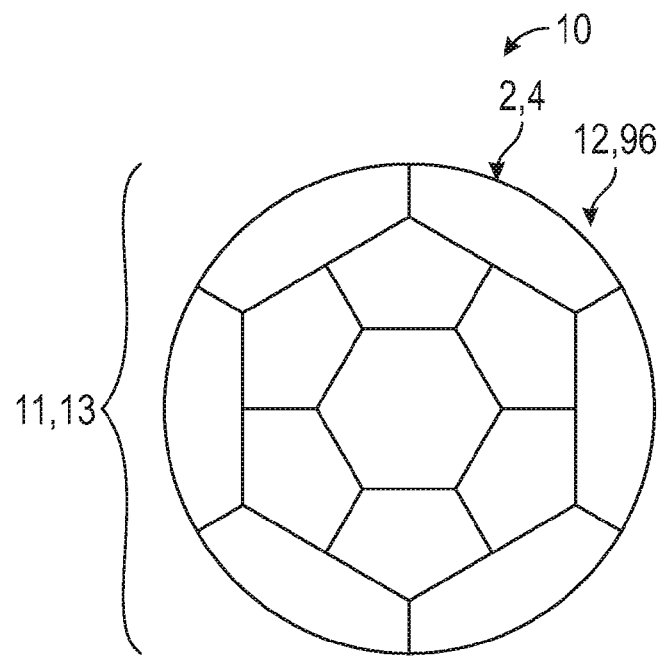
Figure 13E:
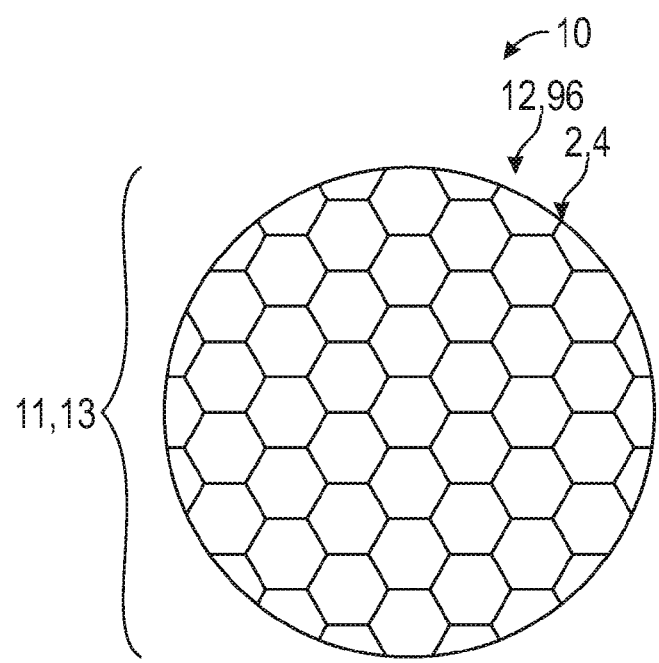
Figure 13F:
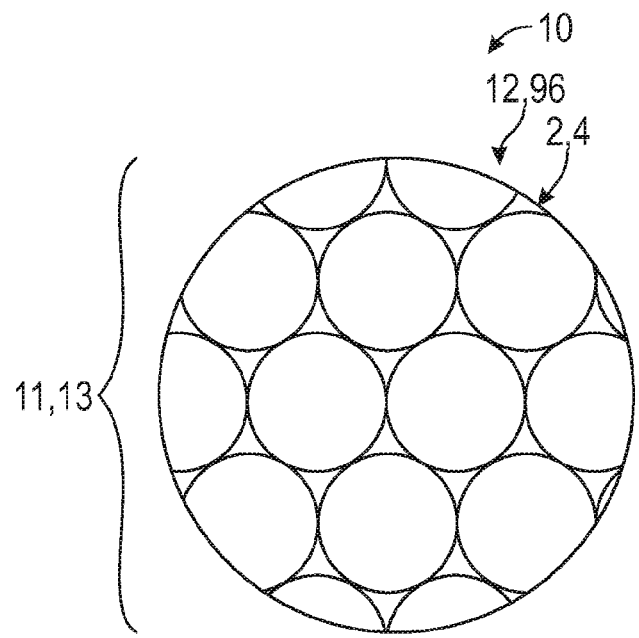
Figure 13G:
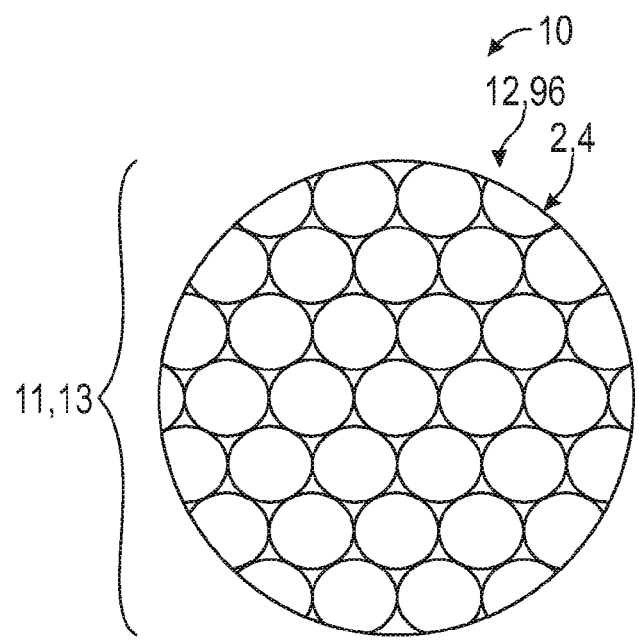

In the embodiments of fastener plug 10 shown in FIGS. 1A-1G, the fastener plug 10 and the plug body 12 include a first end 2 and an opposed second end 4 of the plug body. The embodiments described below do not include optional outer layer 234 and inner layer 236 of a coating material, such as coating material 18, illustrated in FIGS. 1A and 1B. First end 2 and second end 4 each comprise an exposed end 46 as described herein. At least one of the first end 2 and the second end 4 includes the non-planar portion 13 of the outer surface 19 defining the surface texture 15 as shown in FIGS. 10A-11B. Either of first end 2, which in the embodiments of FIGS. 1A-1G is oriented closest to the first surface 104 of article 100 such as the outer diameter of a tubular (e.g. basepipe 210), or second end 4 which is oriented closest to the second surface 106 of article 100 such as the inner diameter of a tubular (e.g. basepipe 210), or both first and second ends 2, 4, may include the non-planar portion 13 of the outer surface 19 defining the surface texture 15. On a given end, the non-planar portion 13 and surface texture 15 may be the same over the portion of the outer surface 19 on which it is included, or may vary across this portion of the outer surface 19. Similarly, in the embodiments of FIGS. 5-9, the fastener plug body 96 is disposed within a fastener jacket 90 and can comprise one or more jacket member, such as upper jacket member 88 and lower jacket member 86, and houses the fastener plug body 96. The fastener plug body 96 includes an upper surface (e.g. first end 2) and a lower surface (e.g. second end 4) that also each comprise an exposed end 46 as described herein. At least one of the first end 2 and the second end 4 includes the non-planar portion 13 of the outer surface 19 defining the surface texture 15. Either of first end 2, which in the embodiments of FIGS. 5-9 is oriented closest to the first surface 104 of article 100 such as the outer diameter of a tubular like basepipe 210, or second end 4 which is oriented closest to the second surface 104 of article 100 such as the inner diameter of a tubular like basepipe 210, or both ends, may include the non-planar portion 13 of the outer surface 19 defining the surface texture 15. On a given end of plug body 96, the non-planar portion 13 and surface texture 15 may be the same over the portion of the outer surface 19 on which it is included, or may vary across this portion of the outer surface 19. For example, non-planar portion may have the same repeating pattern of geometric shapes, as shown for example in FIG. 13A, or may have a pattern of geometric or other shapes that vary in size as shown for example in FIG. 13C, or combines different geometric elements as shown in FIG. 13D.

The non-planar portion 13 of the outer surface 19 defining the surface texture 15 may have any suitable configuration that causes or enables the liberated coating layer 16' to become frangible and capable of separation into a plurality of pieces 21 by action of a wellbore fluid against the coating layer. In certain embodiments, for example, the surface texture 15 may comprise a single regular repeating pattern. In other embodiments, the surface texture 15 may comprise a combination of one or more repeating patterns. In yet other embodiments, the surface texture 15 may comprise a non-regular, non-repeating pattern, including a random pattern.

Figure 12A:
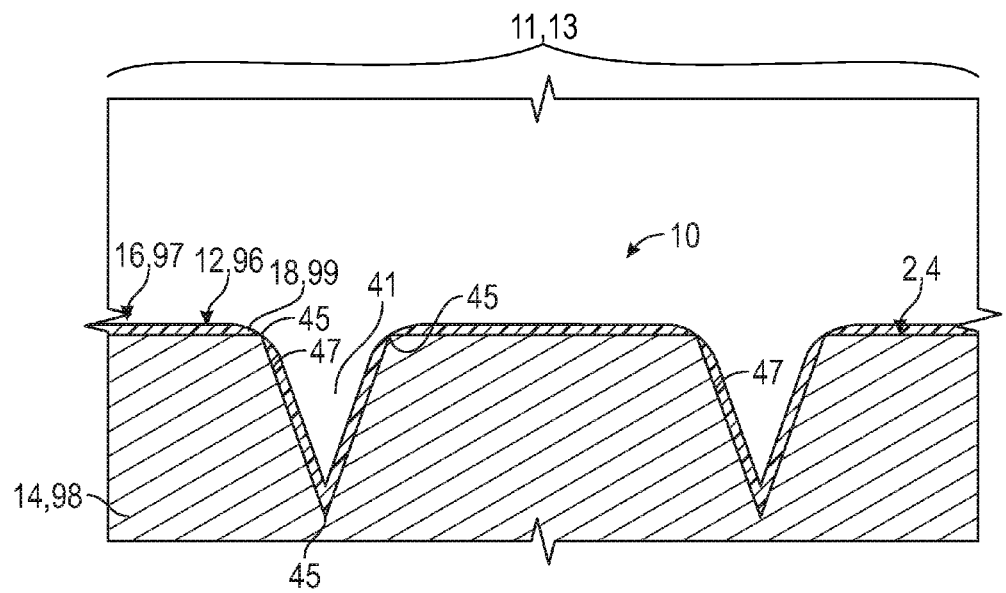
FIGS. 12A-12C are schematic cross-sectional views of an embodiment of a coated fastener plug (FIG. 12A) having the plug body of FIG. 10A and a sealant coating as described herein and a method of using the plug by selectively removing the plug body (FIG. 12B) and using a wellbore fluid to break the sealant coating into pieces (FIG. 12C)
Figure 12B:
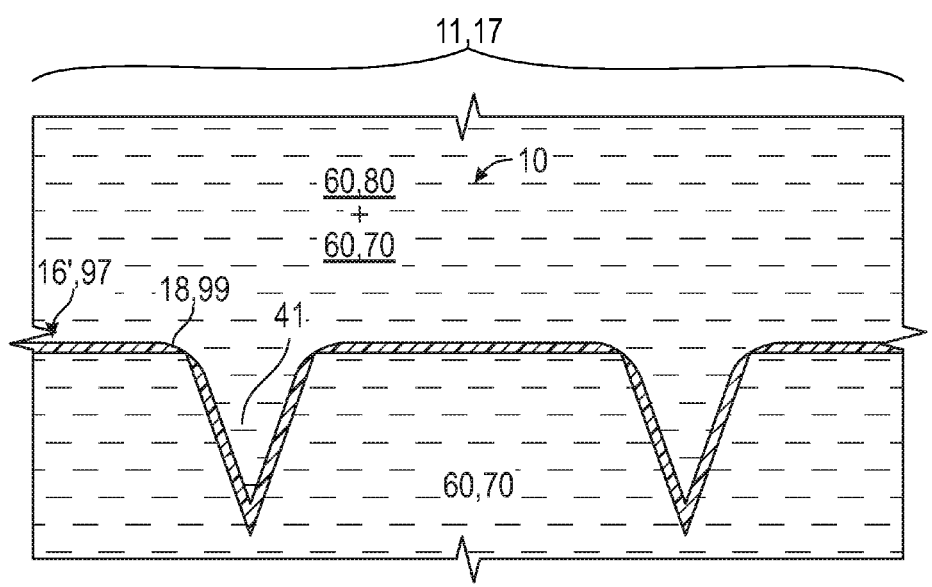
Figure 12C:
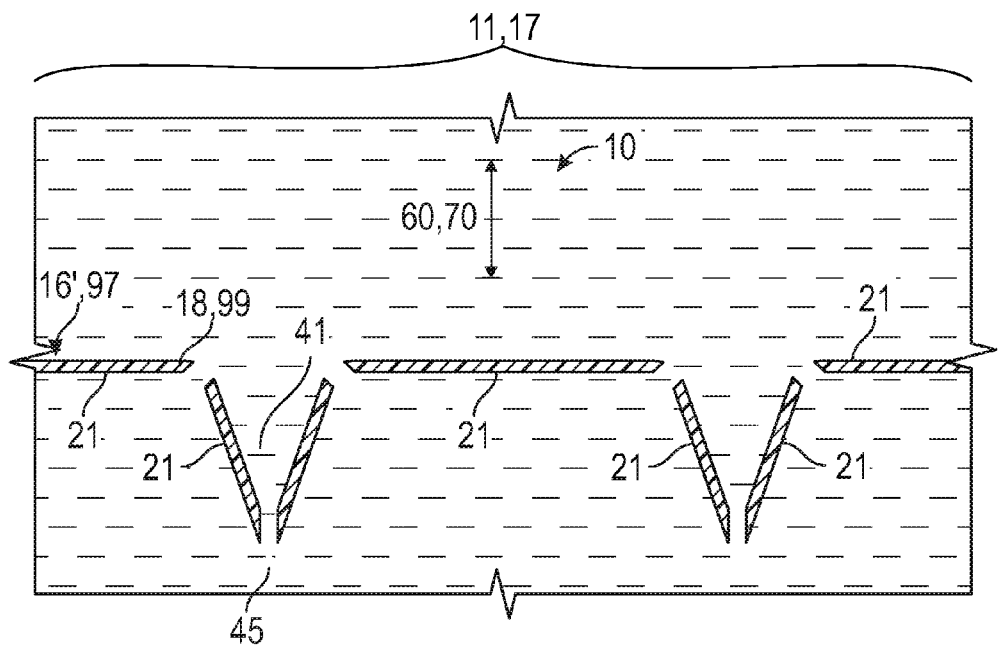

In one embodiment, the non-planar portion 13 of outer surface 19 includes a pattern of indentations 41 in or protrusions 43 from the outer surface 19, or a combination thereof, as illustrated generally in FIGS. 10A and 10B and FIGS. 11A and 11B, respectively. The indentations 41 and/or protrusions 43 define the non-planar surface 13 and the surface texture 15. Without being bound by theory, application of the coating layer 16 to the non-planar surface 13 and surface texture 15, such as by dipping the plug body 12 in a liquid coating material 18 or spraying a liquid coating material 18, for example, may cause localized thinning or weakening of the coating layer 16 at inflection points or edges 45 that are associated with or define the indentations 41 and/or protrusions 43. The coating layer 16 may be applied to the plug body 12 by any suitable method, including application of coating material 18 as a liquid, powder, or dry film or the like. The resulting thinning or weakness of the coating layer 16 at the edges 45 promotes frangibility and separation of the liberated coating layer 16', in whole or in part, along the edges 45 into a plurality of pieces 21 as illustrated in FIGS. 12A-12C. In FIG. 12A, the coating layer 16 has been applied, and may provide thinning or weakness along the edges 45. In FIG. 12B, the coating is permeated or penetrated by a first wellbore fluid 60,80 and then exposed to second wellbore fluid 60, 70 to selectively remove the plug body 12, 96 by dissolution as described herein. In FIG. 12C, a change in the flow or pressure of the second wellbore fluid 60, 70 acts against the liberated sealant coating 16' causing the frangible coating to fragment into or otherwise form pieces 21.

The indentations 41 or protrusions 43, or a combination thereof, may have or define any suitable shape 11 of the sealant coating 16 and portion 17. In one embodiment as illustrated in FIGS. 13 A-G, indentations 41 comprising a pattern or network of intersecting grooves 47 (FIGS. 10A and 10B) that defines a plurality of shapes 11 whose peripheries are defined by the intersecting grooves 47 formed in the outer surface of the first end 2 or the second end 4. In particular, intersecting grooves 47 are configured to provide or define a peripheral shape in the outer surface 19 comprising a polygon or closed-curve shape, or a combination thereof. The polygonal or closed-curve shapes may be regular, including symmetric about one or more axes, or irregular. As shown in FIGS. 12A-12G, the pattern of intersecting or interconnected indentations 41 in the form of grooves 47 define peripheral shapes in the form of various polygons, including diamonds (FIG. 13A), pyramids (FIG. 13A), triangles (FIG. 13B), squares (FIG. 13 C), rectangles (FIG. 13 C), pentagons (FIG. 13 D), hexagons (FIG. 13 E), or other polygons, or a combination thereof, defining a plurality of edges 45 to promote separation into pieces 21.

In certain other embodiments, the indentations 41 or protrusions 43, or a combination thereof, have or define a peripheral shape in the form of a closed-curve, including circular (FIG. 13F) or elliptical (FIG. 13G) shapes. The indentation 41 may have any suitable shape or size. In one embodiment, the grooves 47 have a depth (d) up to about 0.060 inches, and more particularly about 0.010 to about 0.060 inches.

In another embodiment, protrusions 43 comprising a pattern or network of intersecting ridges 48 (FIGS. 11A and 11B) that defines a plurality of shapes whose peripheries are defined by the intersecting ridges 48 formed in the outer surface of the first end 2 or the second end 4. In particular, intersecting ridges 48 are configured to provide or define a peripheral shape 11 in the outer surface 19 comprising the polygon or closed-curve shapes shown in FIGS. 13A-13G, or a combination thereof. In one embodiment, the ridges 48 have a height (h) up to about 0.060 inches, and more particularly about 0.010 to about 0.060 inches.

In one embodiment, the selectively removable fastener plug 10 is a downhole plug suitable for sealably plugging an orifice 102 of a downhole tool 112 or component 114, as described herein. Upon selective removal of the plug body 12, 96 by a wellbore fluid, as described herein, the non-planar portion 13 of the outer surface 19 and surface texture 15 are configured to cause fragmentation or separation of the liberated coating layers 16' into pieces 21 by action of a wellbore fluid, such as second wellbore fluid 60, 70. Fastener plugs 10 that incorporate the non-planar portion 13 of the outer surface 19 and surface texture 15 enable modification of the method 300 of (FIG. 4) of opening an orifice 102 in a downhole article 110. In particular, the method 300 may be modified after exposing 340 the plug body 12, 96 to the second wellbore fluid 60, 70 for a sufficient time to selectively and controllably remove the plug body 12, 96 by the addition of using 350 the second wellbore fluid 60, 70 to break the liberated sealant coating 16' that had been disposed on the non-planar portion 13 into a plurality of pieces 21. More particularly, the pressure or flow rate of the second wellbore fluid 60, 70 may be selectively controlled to provide a change, including an increase or a decrease in the pressure or an increase or a decrease in the flow rate, or a combination thereof, proximate the fastener plug 10, including upstream or downstream of the fastener plug 10, to cause the sealant coating 16, particularly the liberated sealant coating 16', to fragment into or otherwise form pieces 21. Upon selective removal of the plug body 12, 96 by the second wellbore fluid 60, 70, the shape 11 of the sealant coating 16, particularly the liberated sealant coating 16', is configured to promote separation into the plurality of pieces 21 by action of the second wellbore fluid 60, 70, such as by separation of the liberated coating 16' along one or more of edges 45, and including separation along all or substantially all of the edges 45. As described herein, the non-planar portion 13 and surface texture 15 provide a shape 11 of the sealant coating 16 that promotes separation of the liberated sealant coating 16' into a plurality of pieces 21 that are configured to pass through or are configured not to clog downstream articles, such as various screens 250, fluid passageways 254,280, and gravel packs 263.

The indentations 41 or protrusions 43 may be formed in the first end 2 or second end 4 by any suitable method. This may include forging or pressing these features into the plug body 12, 96 during compaction of a powder used to form the plug body 12, 96, as described herein. The indentations 41 or protrusions 43 may also be formed in operations other than the compaction of the powder, including, for example, additional forging, pressing or deformation-based operations that form the indentations 41 or protrusions 43 by deforming the outer surface 19 to form the non-planar portion 13 and surface texture 15. The indentations 41 or protrusions 43 may also be formed in operations other than the compaction of the powder, such as by machining, grinding or methods of removing a portion of the outer surface 19.

As used herein, the terms "a" and "an" do not denote a limitation of quantity, but rather denote the presence of at least one of the referenced item. The term "or" means "and/or" unless clearly indicated otherwise by context. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims. "Optional" or "optionally" means that the subsequently described event or circumstance may or may not occur, and that the description includes instances where the event occurs and instances where it does not. The terms "about" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations. The endpoints of all ranges directed to the same component or property are inclusive of the endpoints, are independently combinable, and include all intermediate points and ranges optional: [(e.g., ranges of "up to about 25 wt. %, or, more specifically, about 5 wt. % to about 20 wt. %," is inclusive of the endpoints and all intermediate values of the ranges of "about 5 wt. % to about 25 wt. %," such as about 10 wt. % to about 23 wt. %, etc.). The terms "first," "second," and the like, "primary," "secondary," and the like, as used herein do not denote any order, quantity, or importance, but rather are used to distinguish one element from another. The term "combination" is inclusive of blends, mixtures, alloys, reaction products, and the like.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A method of opening an orifice in a downhole article, comprising:
    forming a downhole article having an orifice, the orifice having a selectively removable plug sealingly disposed therein, the selectively removable plug comprising a selectively removable plug body formed of a plug body material and a selectively removable sealant coating formed of a coating material disposed on an outer surface of the plug body, a first end and an opposed second end of the plug body, at least one of the first end and the second end comprising a non-planar portion of the outer surface defining a surface texture, the non-planar portion and surface texture defining a shape of the sealant coating disposed thereon;
    disposing the article within a wellbore;
    exposing the selectively removable plug to a first wellbore fluid that is configured to selectively remove the sealant coating of the non-planar portion to provide a liberated sealant coating and provide a fluid access to the plug body;
    exposing the selectively removable plug body to a second wellbore fluid through the fluid access that is configured to selectively remove the plug body, and
    using the second wellbore fluid to break the liberated sealant coating into a plurality of pieces.

2. The method of claim 1, wherein upon selective removal of the plug body by the second wellbore fluid, the shape of the sealant coating is configured to promote separation into a plurality of pieces by action of the second wellbore fluid.

3. The method of claim 1, wherein the surface texture comprises a pattern of indentations in or protrusions from the outer surface, or a combination thereof.

4. The method of claim 3, wherein the indentations or protrusions, or a combination thereof, have a peripheral shape comprising a polygon or a closed-curve shape, or a combination thereof.

5. The method of claim 1, wherein the selectively removable plug body is sealingly disposed within a fastener jacket that is attached to and sealably disposed within the orifice.

6. The method of claim 1, wherein the orifice comprises a plurality of orifices and the selectively removable plug comprises a plurality of selectively removable plugs each sealingly disposed in a corresponding orifice.

7. The method of claim 1, wherein exposing the selectively removable plug to a first wellbore fluid comprises exposing the selectively removable plug to a basic wellbore fluid.

8. The method of claim 1, wherein exposing the selectively removable plug to a second wellbore fluid through the fluid access comprises exposing a surface of the plug body to an acidic wellbore fluid.

9. A selectively removable fastener plug, comprising:
    a selectively removable plug body formed of a selectively removable plug body material;
    a selectively removable sealant coating comprising a selectively removable coating material disposed on an outer surface of the plug body; and
    a first end and an opposed second end of the plug body, at least one of the first end and the second end comprising a non-planar portion of the outer surface defining a surface texture,
    wherein the surface texture comprises a pattern of indentations in or protrusions from the outer surface, or a combination thereof.

10. The plug of claim 9, wherein the first end and the second end comprise the non-planar portion of the outer surface defining the surface texture.

11. The plug of claim 9, wherein the plug body is configured for installation into an orifice in a tubular member having an outer surface and in inner surface, the first end disposed closer to the outer surface and the second end disposed closer to the inner surface.

12. The plug of claim 9, wherein the indentations or protrusions, or a combination thereof, have a peripheral shape comprising a polygon or a closed-curve shape, or a combination thereof.

13. The plug of claim 9, wherein the indentations or protrusions, or a combination thereof, have a peripheral shape comprising a diamond, pyramid, triangle, square, rectangle, star, circle, ellipse, or a combination thereof.

14. The plug of claim 9, wherein the indentations or protrusions, or a combination thereof, are defined by a pattern of grooves formed in the outer surface of the first end or the second end.

15. The plug of claim 9, wherein the indentations or protrusions, or a combination thereof, comprise a pattern of indentations in the outer surface.

16. The plug of claim 9, wherein the selectively removable fastener plug is a downhole plug for an orifice of a downhole tool or component, and wherein upon selective removal of the plug body by a wellbore fluid, the non-planar portion of the outer surface and surface texture are configured to cause separation of the removable coating by action of the wellbore fluid.

17. The plug of claim 9, wherein the selectively removable plug body is sealingly disposed within a fastener jacket.

18. A downhole basepipe assembly, comprising:
a basepipe, the basepipe having a pipe wall and an orifice that extends through the wall from an inner surface to the outer surface;
a selectively removable plug sealingly disposed in the orifice, the selectively removable plug comprising a selectively removable plug body formed of a plug body material, a selectively removable sealant coating formed of a coating material disposed on an outer surface of the plug body, and a first end and an opposed second end of the plug body, at least one of the first end and the second end comprising a non-planar portion of the outer surface defining a surface texture; and
a screen disposed on a portion of an outer surface of the basepipe and attached to the outer surface about a periphery thereof, the orifice disposed under the screen,
wherein the surface texture comprises a pattern of indentations in or protrusions from the outer surface, or a combination thereof.

19. The downhole basepipe assembly of claim 18, wherein the first end and the second end comprise the non-planar portion of the outer surface defining the surface texture.

20. The downhole basepipe assembly of claim 18, wherein the indentations or protrusions, or a combination thereof, have a peripheral shape comprising a polygon or a closed-curve shape, or a combination thereof.

21. The downhole basepipe assembly of claim 18, wherein the indentations or protrusions, or a combination thereof, are defined by a pattern of grooves formed in the outer surface of the first end or the second end.

22. The downhole basepipe assembly of claim 18, wherein upon selective removal of the plug body by a wellbore fluid, the non-planar portion of the outer surface and surface texture are configured to cause separation of the removable coating into a plurality of pieces by action of the wellbore fluid.

23. The downhole basepipe assembly of claim 22, wherein the plurality of pieces are configured to pass through the screen.

24. The downhole basepipe assembly of claim 22, wherein the plurality of pieces are configured not to plug the screen.

25. The downhole basepipe assembly of claim 18, further comprising an upper packer proximate one end of the screen and a lower packer proximate an opposing end of the screen.

26. The downhole basepipe assembly of claim 18, wherein the selectively removable plug body is sealingly disposed within a fastener jacket that is attached to and sealably disposed within the orifice.

27. A downhole article, comprising:
an article, the article having an orifice that extends through a wall from an inner surface to an outer surface; and
a selectively removable plug sealingly disposed in the orifice, the selectively removable plug comprising a selectively removable plug body formed of a plug body material, a selectively removable sealant coating formed of a coating material disposed on an outer surface of the plug body, a first end and an opposed second end of the plug body, at least one of the first end and the second end comprising a non-planar portion of the outer surface defining a surface texture,
wherein the surface texture comprises a pattern of indentations in or protrusions from the outer surface, or a combination thereof.

28. The downhole basepipe assembly of claim 27, wherein the selectively removable plug body is sealingly disposed within a fastener jacket that is attached to and sealably disposed within the orifice.

* * * * *